United States Patent
Kaneko

(10) Patent No.: US 8,096,233 B2
(45) Date of Patent: Jan. 17, 2012

(54) SERVO PRESS LINE OPERATION METHOD AND SERVO PRESS LINE OPERATION CONTROL DEVICE

(75) Inventor: Sotoyuki Kaneko, Sagamihara (JP)

(73) Assignee: Aida Engineering, Ltd., Sagamihara (JP)

( * ) Notice: Subject to any disclaimer, the term of this patent is extended or adjusted under 35 U.S.C. 154(b) by 322 days.

(21) Appl. No.: 12/497,773

(22) Filed: Jul. 6, 2009

(65) Prior Publication Data

US 2010/0000424 A1    Jan. 7, 2010

(30) Foreign Application Priority Data

Jul. 7, 2008  (JP) ................ 2008-176972

(51) Int. Cl.
*B30B 13/00*  (2006.01)
*B30B 15/14*  (2006.01)
*B21C 51/00*  (2006.01)

(52) U.S. Cl. ......... 100/35; 100/48; 100/207; 72/17.2; 72/20.3; 72/405.01

(58) Field of Classification Search ........... 100/35, 100/48, 207; 72/3, 405.1, 405.09, 405.11, 72/405.12, 405.13, 17.2, 20.1, 21.4, 405.01; 198/468.01, 468.2, 468.3, 468.4, 620
See application file for complete search history.

(56) References Cited

U.S. PATENT DOCUMENTS 5,970,763 A * 10/1999 Takayama .................. 72/1
6,742,457 B2 * 6/2004 Shiroza ................... 101/485

FOREIGN PATENT DOCUMENTS

| EP | 0837379 A1 | 4/1998 |
| EP | 1615090 A1 | 1/2006 |
| JP | 7-1060 A | 1/1995 |
| JP | 2000-343294 A | 12/2000 |
| JP | 2003-191096 A | 7/2003 |
| JP | 2005-297010 A | 10/2005 |
| JP | 2006-130560 A | 5/2006 |
| WO | 2007/091964 A2 | 8/2007 |

* cited by examiner

*Primary Examiner* — Jimmy T Nguyen

(74) *Attorney, Agent, or Firm* — McDermott Will & Emery LLP

(57) ABSTRACT

A servo press line operation control device includes a normal press operation control section, a normal transfer operation control section, an upward movement step delay determination section, a downstream-side transfer step delay correction control section, an upstream-side transfer step delay determination section, a slide downward movement step delay correction control section, and the like. The servo press line operation control device performs a normal press operation that adjusts a slide position to a target slide position based on slide motion information, performs a normal transfer operation that adjusts a transfer position to a target transfer position based on transfer motion information, performs a correction that delays a transfer step of a downstream-side servo transfer device as compared with the normal transfer operation when a slide upward movement step is in a delayed state, and performs a correction that delays a slide downward movement step of a servo press as compared with the normal press operation when an upstream-side transfer step is in the delayed state.

5 Claims, 13 Drawing Sheets

FIG.5
(A)
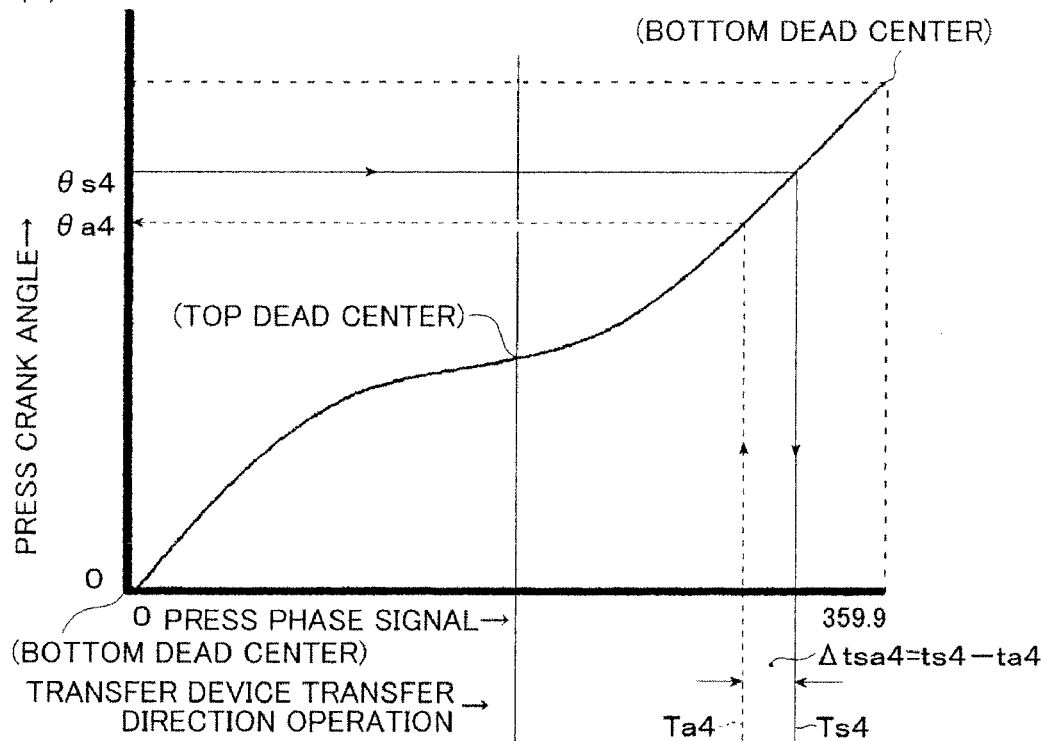
(B)
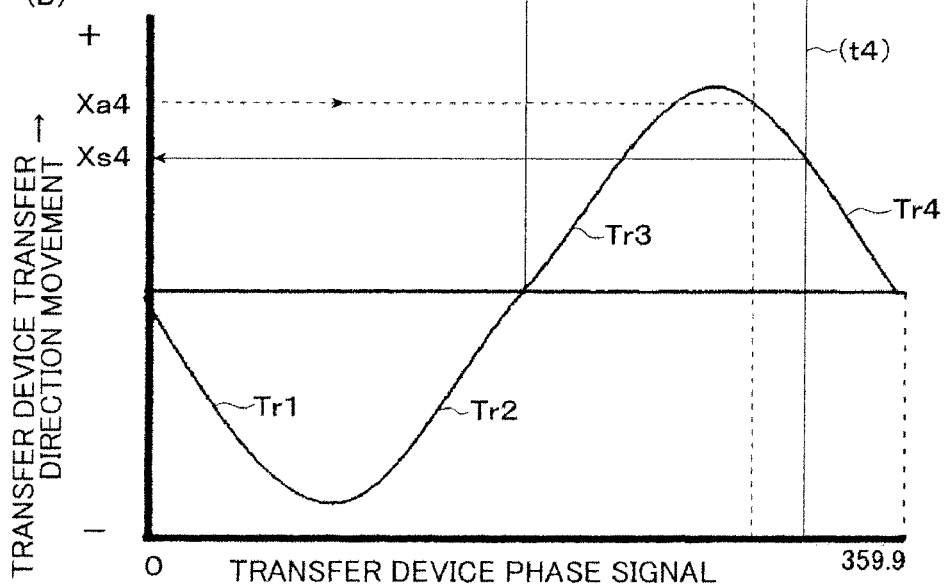

FIG.7
(A)
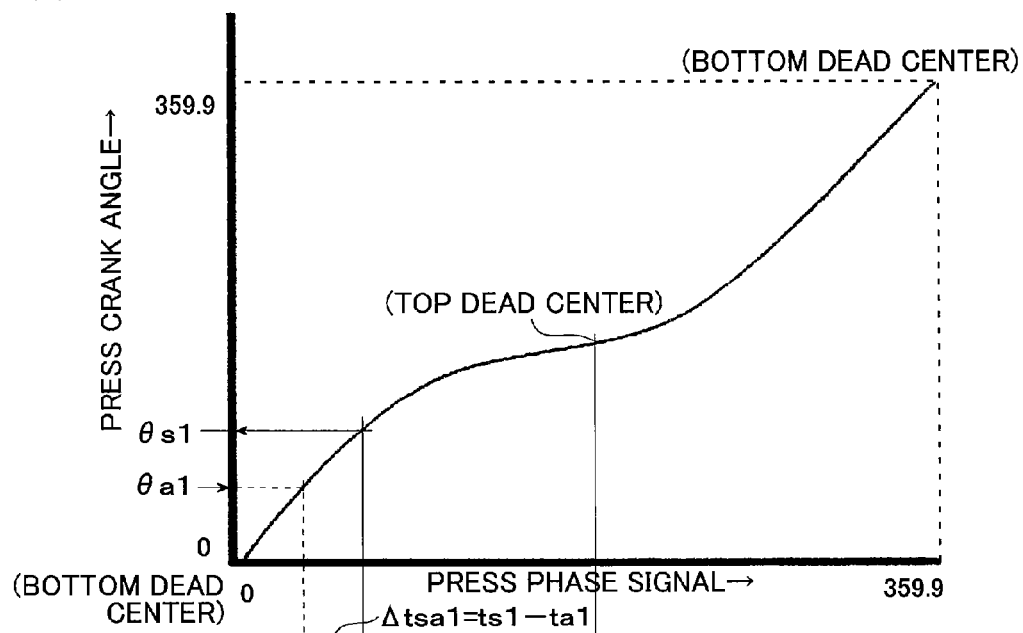
(B)
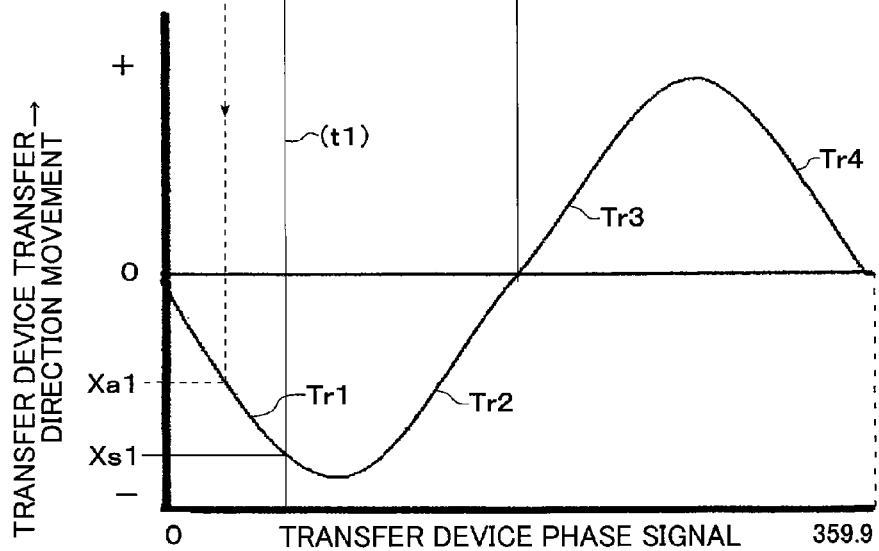

US 8,096,233 B2

SERVO PRESS LINE OPERATION METHOD AND SERVO PRESS LINE OPERATION CONTROL DEVICE

CROSS REFERENCE TO PRIOR APPLICATIONS

The present application claims priority under U.S.C. §119 to Japanese Patent Application No. 2008-176972, filed Jul. 7, 2008. The content of the application is incorporated herein by reference in its entirety.

BACKGROUND OF THE INVENTION

The present invention relates to an operation method and an operation control device for a servo press line in which a servo press and a servo transfer device are alternately disposed in the workpiece transfer direction.

A servo press line in which a servo press and a servo transfer device are alternately disposed in the workpiece transfer direction has been known. For example, a servo press line illustrated in FIG. 12 has a configuration in which a servo transfer device 30 is disposed between servo presses 10U and 10D. In FIG. 12, a first servo transfer device disposed on the upstream side of the left (first) servo press 10U is omitted.

Each of the servo presses 10U and 10D includes a slide 12, an upper die 13, a lower die 17, a bolster 18, and the like, and can perform a press operation. The servo transfer device 30 includes a main body 31, a carrier 32, and an adsorbing section 33, and can perform a transfer operation. In FIG. 13, the servo transfer device 30 disposed between the servo presses is illustrated at the center.

In FIGS. 12 and 13, a workpiece 35 transferred from the first servo transfer device to the first (left) servo press 10U (refer to a transfer step Tr3 (=Tr31+Tr32) in FIG. 13) is placed on the lower die 17 of the servo press 10U, and subjected to first press. The workpiece 35 subjected to first press is transferred to a neutral position Z by the second servo transfer device 30 disposed on the downstream side in the transfer direction (disposed between the presses 10U and 10D in FIG. 12) (transfer step Tr2 (=Tr21+Tr22) in FIG. 13), transferred to the servo press 10D (transfer step Tr3 (=Tr31+Tr32) in FIG. 13), and placed on the lower die 17 of the downstream-side servo press 10D.

The second servo transfer device 30 is moved from the second servo press 10D to the neutral position Z in an empty state (transfer step Tr4 (=Tr41+Tr42) in FIG. 13), and moved to the upstream-side servo press 10U in an empty state for the subsequent transfer cycle (transfer step Tr1 (=Tr11+Tr12) in FIG. 13). The servo transfer device 30 thus performs a normal transfer operation. The workpiece 35 is sequentially transferred to the downstream side by each servo transfer device 30, and subjected to given press by each servo press 10 to obtain a product.

The servo press line operation control method is classified as a master-slave method and an integral control method in the same manner as other industrial machines.

The master-slave method causes a slave press to follow a master press so that a difference in speed between the presses does not occur. For example, JP-A-2000-343294 discloses a method that causes the press speed of each press to follow the press speed of the first press (synchronous operation). The master-slave method relatively improves productivity as compared with a press line in which a press having a clutch-brake is disposed (i.e., the slide is temporarily stopped at the top dead center position corresponding to one rotation of the crank shaft). However, when a problem (e.g., a decrease in speed) occurs in the master press, the problem also occurs in each slave press.

In a servo press line using the integral control method, each servo press is integrally controlled. As illustrated in FIG. 12, a host controller 60P issues press instructions to each press controller 25P of each servo press 10, for example. Likewise, the host controller 60P issues transfer instructions to each transfer controller 55P of each servo transfer device 30. A display operation section 70P includes a display section 71 and an operation section 72.

In the press line in which the slide is temporarily stopped at the top dead center position, the press speed of the master press is reduced to a large extent in order to prevent a breakage of an expensive die. However, since the productivity decreases when reducing the press speed, this method cannot be directly employed for the servo press line using the integral control method. Specifically, the master-slave method cannot ensure the advantage (free slide motion) of the servo press.

For example, JP-A-2003-191096 discloses a servo press line in which the press speed of each servo press need not be reduced over the entire steps. This press line is formed so that each press is equally handled. The slide speed of each servo press is adjusted to the slide speed of one servo press (e.g., a servo press having the lowest slide speed) until the slide position reaches the workpiece transfer allowable position, and each slide position can reach the workpiece transfer allowable position at the same time. Therefore, the productivity can be improved while preventing interference.

As a servo press line that aims at further improving productivity, JP-A-2006-130560 discloses a servo press line in which an instruction value that quickens (or delays) the movement of the slide is output to the servo press that is determined to be delayed (or advanced) as compared with a reference press step (slide movement) so that the slide movement of each servo press is adjusted to (synchronized with) the reference slide movement.

However, the servo press line disclosed in JP-A-2006-130560 performs synchronization control between the servo presses having a relatively high speed in the same manner as the servo press line disclosed in JP-A-2003-191096, but does not perform synchronization control with the servo transfer device having a relatively low speed. Specifically, interference cannot be prevented by these technologies.

In order to prevent interference while maximizing press productivity, it is desirable to perform a normal transfer operation while setting the servo transfer device having a relatively low speed at the allowable highest transfer speed. The normal press operation is performed while setting the press speed of the servo press having a relatively high speed at a value lower than the allowable highest press speed within a range corresponding to the allowable highest transfer speed. This normal press operation method has been widely used along with the development of hardware and software.

However, the servo characteristics may change to some extent. A change in servo characteristics does not occur every cycle, but occurs due to accidents. A change in servo characteristics of the servo press occurs due to a change in load (press load), failure, or the like. A change in servo characteristics of the servo transfer device occurs due to a change in workpiece weight or mechanical friction, failure, or the like. In either case, the servo characteristics change to the low-speed side as compared with the set operation speed. The servo characteristics do not change to the high-speed side for the above-mentioned reasons.

A change in operation speed affects the productivity to only a small extent, and may be canceled within a short time (e.g., until the subsequent cycle starts). However, since interference occurs due to the relative positional relationship instead of the temporal relationship, it is necessary to deal with such a change in operation speed.

SUMMARY OF THE INVENTION

According to an aspect of the invention, there is provided a method of operating a servo press line in which a servo press having a slide and servo transfer devices are alternately disposed in a workpiece transfer direction, the method having the steps of:

performing a normal press operation that adjusts a slide position of the servo press to a target slide position corresponding to a first step phase that is based on slide motion information while causing the first step phase to advance, and performing a normal transfer operation that adjusts a transfer position of the workpiece of each of the servo transfer devices to a target transfer position corresponding to a second step phase that is based on transfer motion information while causing the second step phase to advance, the second step phase being the same as the first step phase;

performing a correction that delays a transfer step of one of the servo transfer devices disposed on a downstream side of the servo press as compared with the normal transfer operation when a slide upward movement step has been determined to be in a delayed state based on a current first step phase in slide upward movement and an apparent first step phase corresponding to a current actual slide position, the apparent first step phase having been calculated from the slide motion information; and performing a correction that delays a slide downward movement step of the servo press as compared with the normal press operation when an upstream-side transfer step has been determined to be in a delayed state based on a current second step phase in slide downward movement and an apparent second step phase corresponding to a current actual transfer position of the workpiece, the apparent second step phase having been calculated from the transfer motion information of one of the servo transfer devices disposed on an upstream side of the servo press.

According to another aspect of the invention, there is provided a servo press line operation control device in which a servo press having a slide and servo transfer devices are alternately disposed in a workpiece transfer direction, the operation control device including the steps of:

a first information storage section that stores slide motion information in which a first step phase is associated with a target slide position;

a normal press operation control section that controls a normal press operation so that a slide position of the servo press is adjusted to a target slide position corresponding to a current first step phase while causing the first step phase that is based on the slide motion information stored in the first information storage section to advance;

a second information storage section that stores transfer motion information in which a second step phase is associated with a target transfer position, the second step phase being the same as the first step phase based on the slide motion information;

a normal transfer operation control section that controls a normal transfer operation so that a transfer position of the workpiece of each of the servo transfer devices is adjusted to a target transfer position corresponding to a current second step phase while causing the second step phase that is based on the transfer motion information stored in the second information storage section to advance;

a slide position detection section that directly or indirectly detects an actual slide position of the servo press;

a first determination section that determines whether or not a slide upward movement step is in a delayed state based on a current first step phase in slide upward movement during the normal press operation and an apparent first step phase corresponding to the detected current actual slide position, the apparent first step phase having been calculated from the slide motion information;

a first correction control section that performs a correction that delays a transfer step of one of the servo transfer devices disposed on a downstream side of the servo press as compared with the normal transfer operation when the first determination section has determined that the slide upward movement step is in the delayed state;

a transfer position detection section that directly or indirectly detects an actual transfer position of the workpiece of the servo transfer devices;

a second determination section that determines whether or not an upstream-side transfer step is in the delayed state based on a current second step phase in slide downward movement during the normal press operation and an apparent second step phase corresponding to the detected current actual transfer position of the workpiece, the apparent second step phase having been calculated from the transfer motion information corresponding to one of the servo transfer devices disposed on the upstream side of the servo press; and a second correction control section that performs a correction that delays a slide downward movement step of the servo press as compared with the normal press operation when the second determination section has determined that the upstream-side transfer step is in the delayed state.

BRIEF DESCRIPTION OF THE SEVERAL VIEWS OF THE DRAWING

FIG. 5 is a timing chart for describing a method of determining a delay in a transfer step of an upstream-side servo transfer device.

FIG. 7 is a timing chart for describing a method of determining a delay in a slide upward movement step of an upstream-side servo press.

DETAILED DESCRIPTION OF THE INVENTION

Figure 1:
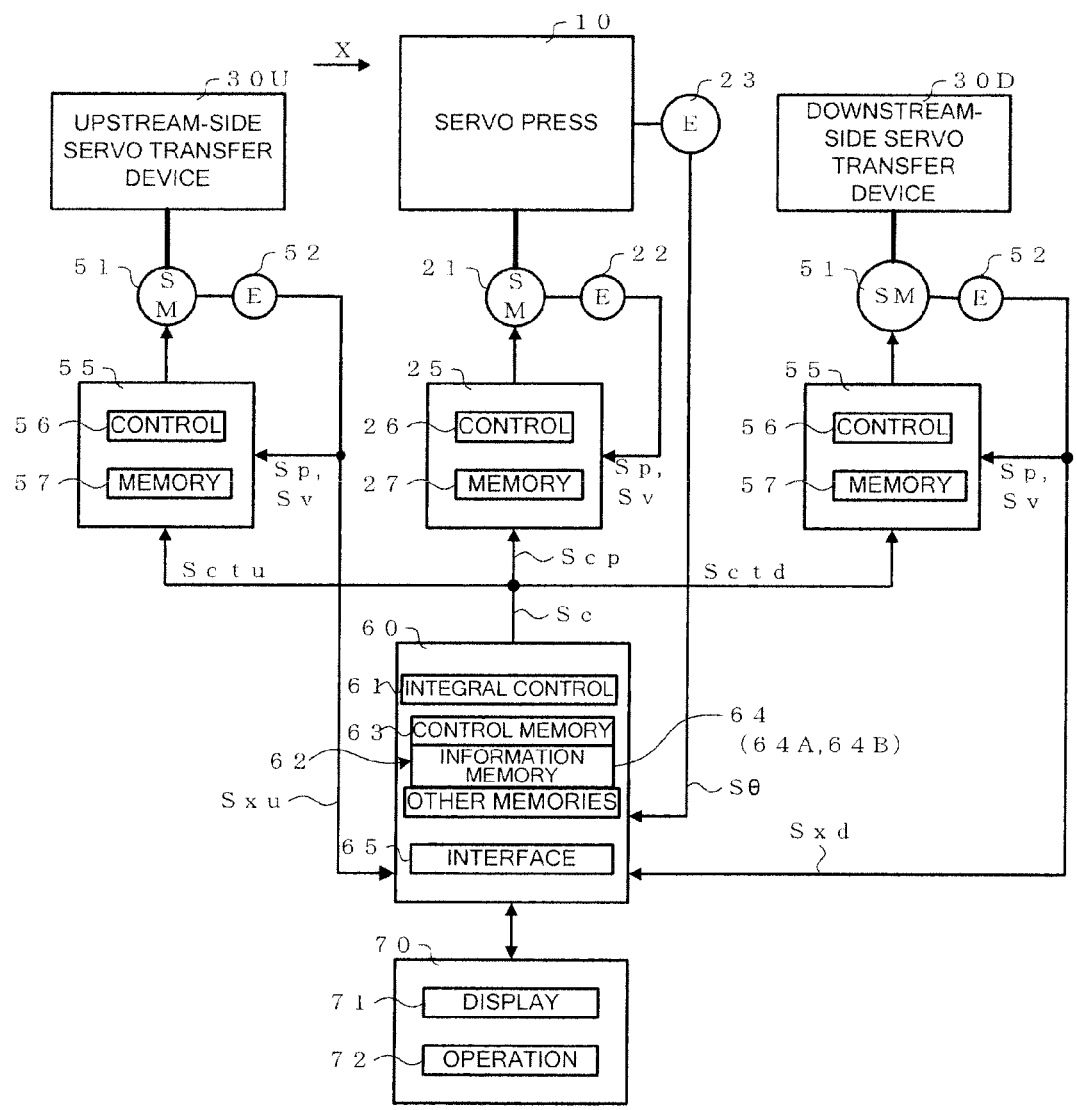
FIG. 1 is a block diagram illustrating a first embodiment of the invention.

The invention may provide a servo press line operation method and a servo press line operation control device that can reliably prevent interference while maximizing press productivity.

In the invention, the entire servo press line is operated by the integral control method from the viewpoint of improving productivity. When a change in press speed or transfer speed occurs, correction control is performed on an arbitrary servo press and servo transfer devices disposed on either side of the servo press by an individual control method. The invention thus prevents interference.

According to one embodiment of the invention, there is provided a method of operating a servo press line in which a servo press having a slide and servo transfer devices are alternately disposed in a workpiece transfer direction, the method having the steps of:

performing a normal press operation that adjusts a slide position of the servo press to a target slide position corresponding to a first step phase that is based on slide motion information while causing the first step phase to advance, and performing a normal transfer operation that adjusts a transfer position of the workpiece of each of the servo transfer devices to a target transfer position corresponding to a second step phase that is based on transfer motion information while causing the second step phase to advance, the second step phase being the same as the first step phase;

performing a correction that delays a transfer step of one of the servo transfer devices disposed on a downstream side of the servo press as compared with the normal transfer operation when a slide upward movement step has been determined to be in a delayed state based on a current first step phase in slide upward movement and an apparent first step phase corresponding to a current actual slide position, the apparent first step phase having been calculated from the slide motion information; and performing a correction that delays a slide downward movement step of the servo press as compared with the normal press operation when an upstream-side transfer step has been determined to be in a delayed state based on a current second step phase in slide downward movement and an apparent second step phase corresponding to a current actual transfer position of the workpiece, the apparent second step phase having been calculated from the transfer motion information of one of the servo transfer devices disposed on an upstream side of the servo press.

According to the above servo press line operation method, the servo press line can be operated while reliably preventing interference and maximizing press productivity.

According to one embodiment of the invention, there is provided a servo press line operation control device in which a servo press having a slide and servo transfer devices are alternately disposed in a workpiece transfer direction, the operation control device including:

a first information storage section that stores slide motion information in which a first step phase is associated with a target slide position;

a normal press operation control section that controls a normal press operation so that a slide position of the servo press is adjusted to a target slide position corresponding to a current first step phase while causing the first step phase that is based on the slide motion information stored in the first information storage section to advance;

a second information storage section that stores transfer motion information in which a second step phase is associated with a target transfer position, the second step phase being the same as the first step phase based on the slide motion information;

a normal transfer operation control section that controls a normal transfer operation so that a transfer position of the workpiece of each of the servo transfer devices is adjusted to a target transfer position corresponding to a current second step phase while causing the second step phase that is based on the transfer motion information stored in the second information storage section to advance;

a slide position detection section that directly or indirectly detects an actual slide position of the servo press;

a first determination section that determines whether or not a slide upward movement step is in a delayed state based on a current first step phase in slide upward movement during the normal press operation and an apparent first step phase corresponding to the detected current actual slide position, the apparent first step phase having been calculated from the slide motion information;

a first correction control section that performs a correction that delays a transfer step of one of the servo transfer devices disposed on a downstream side of the servo press as compared with the normal transfer operation when the first determination section has determined that the slide upward movement step is in the delayed state;

a transfer position detection section that directly or indirectly detects an actual transfer position of the workpiece of the servo transfer devices;

a second determination section that determines whether or not an upstream-side transfer step is in the delayed state based on a current second step phase in slide downward movement during the normal press operation and an apparent second step phase corresponding to the detected current actual transfer position of the workpiece, the apparent second step phase having been calculated from the transfer motion information corresponding to one of the servo transfer devices disposed on the upstream side of the servo press; and a second correction control section that performs a correction that delays a slide downward movement step of the servo press as compared with the normal press operation when the second determination section has determined that the upstream-side transfer step is in the delayed state.

According to the above servo press line operation control device, the above servo press line operation method can be implemented reliably and smoothly. Moreover, the above servo press line operation control device can be easily implemented and allows simple handling.

In this servo press line operation control device, the first determination section may determine that the slide upward movement step is in the delayed state when the difference between the current first step phase and the apparent first step phase when the slide is moved upward is larger than a first set phase range; and the second determination section may determine that the upstream-side transfer step is in the delayed state when the difference between the current second step phase and the apparent second step phase when the slide is moved downward is larger than a second set phase range.

According to the above servo press line operation control device, more stable delay control can be performed while achieving the above-described effects.

The servo press line operation control device may further have:

a third determination section that determines whether or not a downstream-side transfer step is in the delayed state based on a detected actual transfer position of the workpiece of one of the servo transfer devices disposed on the downstream side of the servo press and a target transfer position corresponding to a current second step phase included in the transfer motion information stored in the second information storage section; and a third correction control section that performs a correction that delays a transfer step of one of the servo transfer devices disposed on the upstream side of the servo press as compared with the normal transfer operation when the third determination section has determined that the downstream-side transfer step is in the delayed state.

According to the above servo press line operation control device, interference between the servo transfer devices disposed on either side of the servo press can be reliably prevented while achieving the above-described effects.

Some embodiments of the invention are described in detail below with reference to the drawings.

A servo press line operation control device according to an embodiment of the invention includes a first information storage section 64A, normal press operation control section 61 and 63, a second information storage section 64B, normal transfer operation control section 61 and 63, slide position detection section 23, 61, and 63, upward movement step delay determination section 61 and 63, downstream-side transfer step delay correction control section 61 and 63, transfer position detection section 52, 61, and 63, upstream-side transfer step delay determination section 61 and 63, and slide downward movement step delay correction control section 61 and 63, the operation control device being capable of performing a normal press operation that adjusts a slide position θai of a servo press 10 to a target slide position θsi while causing a step phase ti based on slide motion information to advance, performing a normal transfer operation that adjusts a transfer position Xai of a servo transfer device 30 to a target transfer position Xsi while causing a step phase ti based on transfer motion information to advance, performing a correction that delays a transfer step Tr11 of a downstream-side servo transfer device 30D as compared with the normal transfer operation when a slide upward movement step is delayed, and performing a correction that delays a slide downward movement step of a servo press 30 as compared with the normal press operation when an upstream-side transfer step Tr41 is delayed.

Figure 3A:
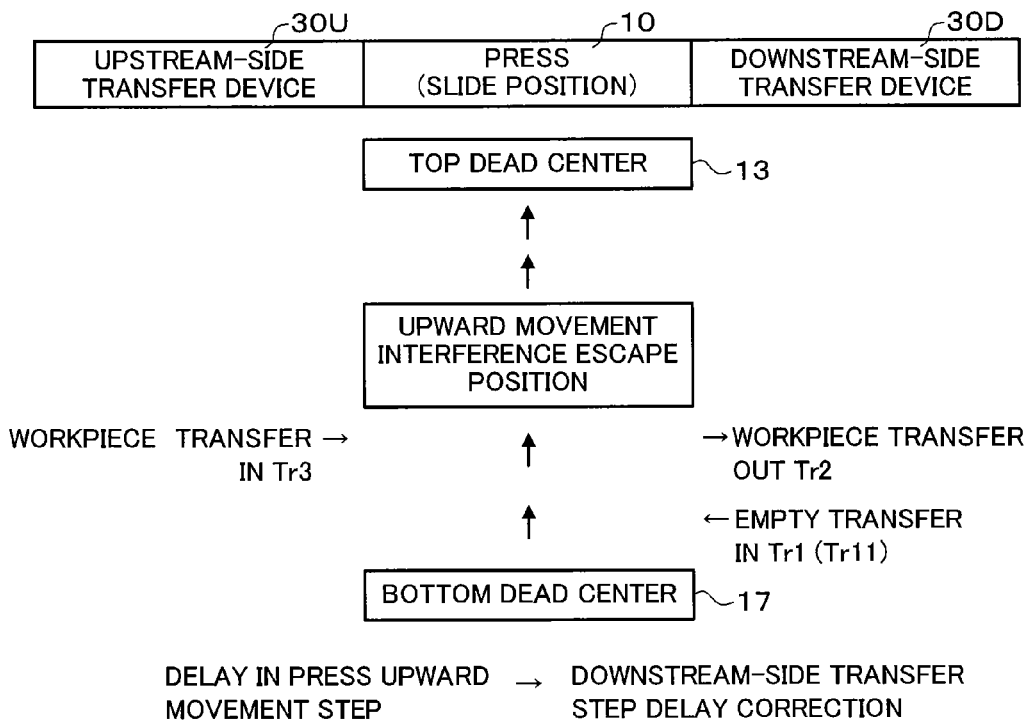
FIGS. 3A and 3B are diagrams for describing the timing relationship between the slide motion of a servo press and the transfer motion of a servo transfer device.
Figure 3B:
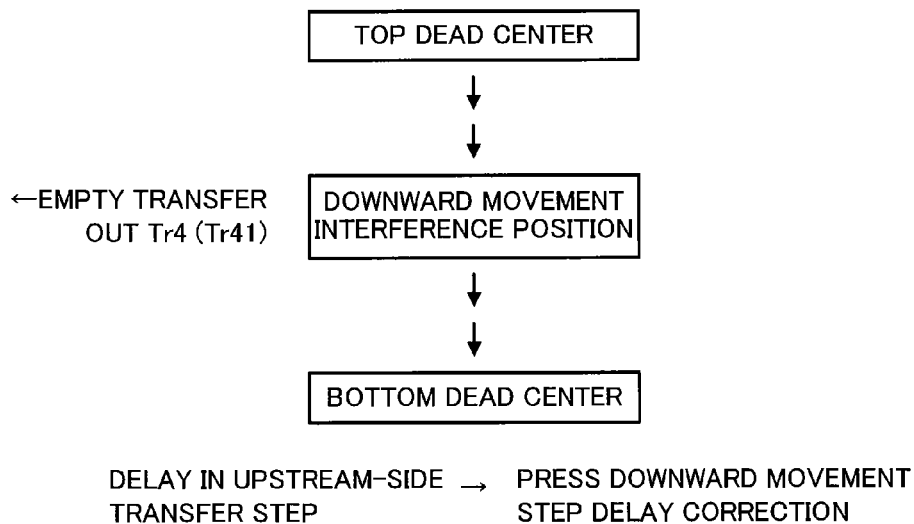
Figure 12:
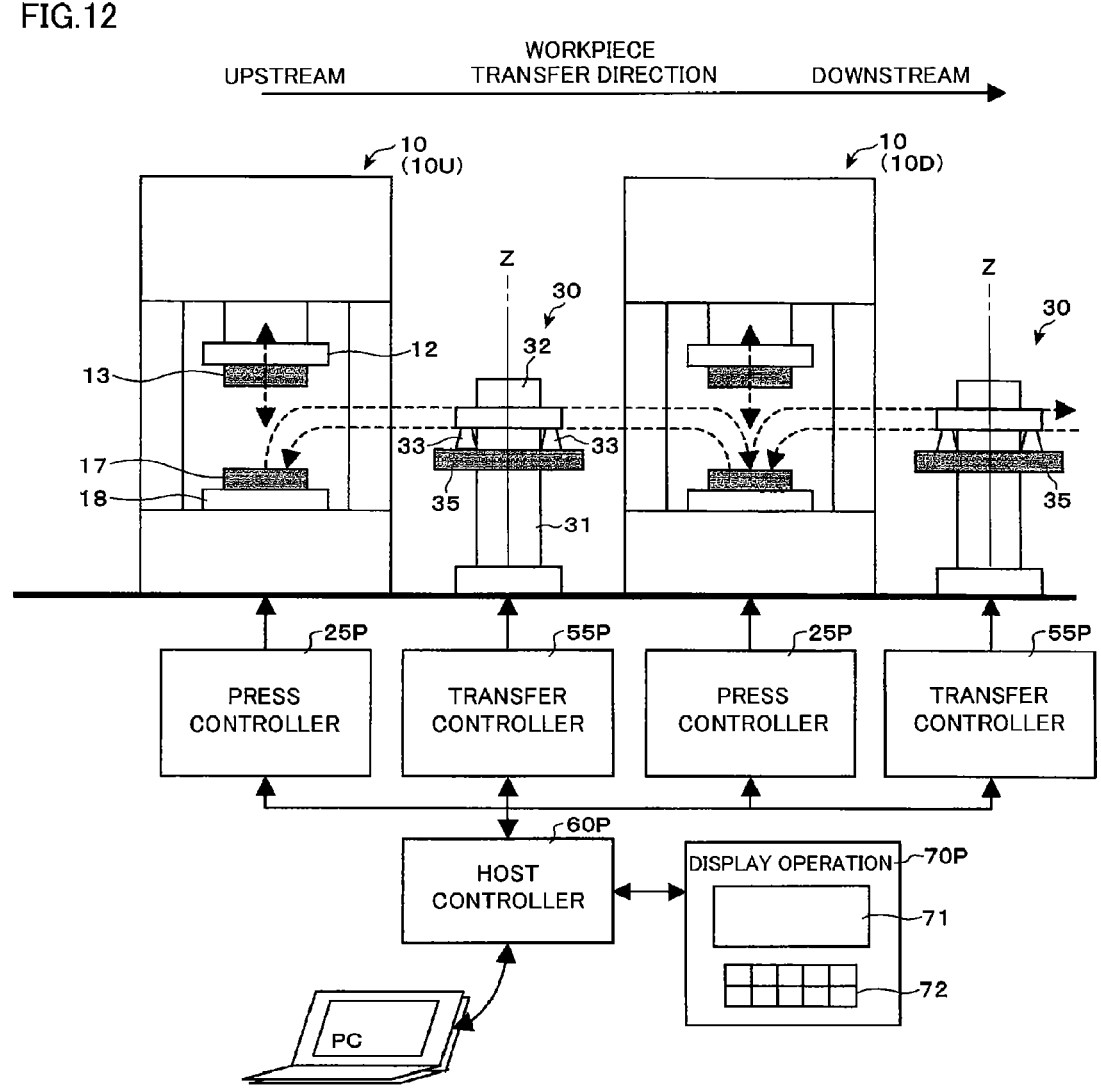
FIG. 12 is a diagram for describing a basic configuration of a servo press line according to the invention and a related-art example.

The basic configuration of the servo press line is similar to that illustrated in FIG. 12. Specifically, the servo press 10 and the servo transfer device 30 are alternately disposed in the transfer direction (hereinafter referred to as "direction X") of a workpiece 35. FIGS. 3A and 3B show the relationship between an upward/downward movement step of a servo press 10U disposed on the upstream side in the direction X (hereinafter may be referred to as "upstream-side servo press") and a servo press 10D disposed on the downstream side in the direction X (hereinafter may be referred to as "downstream-side servo press") and a transfer step of the servo transfer device 30 disposed between the servo press 10U and the servo press 10D. The basic transfer step is similar to that illustrated in FIG. 13.

FIG. 1 is a block diagram for describing the configurations and the control relationship of a servo transfer device 30U disposed on the upstream side in the direction X (hereinafter may be referred to as "upstream-side servo transfer device"), a servo transfer device 30D disposed on the downstream side in the direction X (hereinafter may be referred to as "downstream-side servo transfer device"), and the servo press 10 disposed between the servo transfer device 30U and the servo transfer device 30D.

The servo press 10 is configured so that a slide 12 is moved up and down by controlling the rotation of a press motor 21 using a press controller 25 to rotate a crank shaft (i.e., press operation). The press controller 25 includes a control section 26 and a memory section 27, for example. The press controller 25 controls the rotation of the servomotor 21 based on a press control signal Scp included in an integral control signal Sc input to the press controller 25. The press motor 21 is an AC servo motor. Note that the type of motor is not limited thereto. Likewise, the type of the transfer motor 51 is not particularly limited.

An encoder 22 connected to the press motor 21 detects the rotational angle of the press motor 21. The encoder 22 generates a position feedback signal Sp and a velocity feedback signal Sv of the slide 12, and inputs (feeds back) the position feedback signal Sp and the velocity feedback signal Sv to the press controller 25. An encoder 23 that is directly or indirectly connected to a crank shaft of a crank mechanism (not illustrated) inputs a signal Sθ that corresponds to a detected crank angle θ to a host controller 60. The host controller 60 handles the crank angle θ detected and input by the encoder 23 as a slide position P.

Each of the servo transfer device 30U and the servo transfer device 30D has a structure illustrated in FIG. 12. Specifically, a carrier 32 that can reciprocate in the direction X is mounted on a main body 31 secured at a neutral position Z, and the workpiece 35 can be transferred by reciprocating right and left adsorbing section 33. Note that the type and the structure of the servo transfer device 30 are not limited thereto.

A transfer controller 55 controls the rotation of the transfer motor 51 based on a transfer control signal Sct (i.e., Sctu and Sctd) included in the integral control signal Sc input to the transfer controller 55 to move the carrier 32 rightward and leftward (i.e., transfer operation). The transfer controller 55 includes a control section 56 and a memory section 57, for example. An encoder 52 connected to the transfer motor 51 detects the rotational angle of the transfer motor 51. The encoder 52 generates the position feedback signal Sp and the velocity feedback signal Sv, and inputs (feeds back) the position feedback signal Sp and the velocity feedback signal Sv to the transfer controller 55.

A display operation section 70 includes a display section 71 and an operation section 72 in the same manner as the related-art example (70P). The display section 71 and the operation section 72 may be integrally formed using a touch panel.

The host controller 60 includes an integral control section 61, a control section 62, and an interface section 65, and integrally controls the servo press 10 and the servo transfer device 30. A host PC is omitted in FIG. 1. The control section 62 includes a control memory 63, an information memory 64, and other memories, for example.

The integral control section 61 includes a CPU, a clock circuit, and the like, and integrally controls the entire press line. The control memory 63 mainly includes a nonvolatile memory, and stores an integral control program and a control program (e.g., determination control program) relating to various sections (e.g., detection section, determination section, correction section, and processing section) described later. Specifically, each section such as the normal press operation control section is formed by the control memory 63 that stores the control program and the integral control section 61 that executes the control program, for example. Note that the controllers 25 and 55 may serve as part of the sections, or part of the sections may be formed by the controllers 25 and 55 on condition that the controllers 25 and 55 are integrally controlled by the host controller 60.

The information memory 64 includes a first information storage section 64A that stores the slide motion information in which the step phase is associated with the target slide position, and a second information storage section 64B that stores the transfer motion information in which the step phase is associated with the target transfer position. The step phase of the transfer motion information is the same as the step phase of the slide motion information.

Figure 2A:
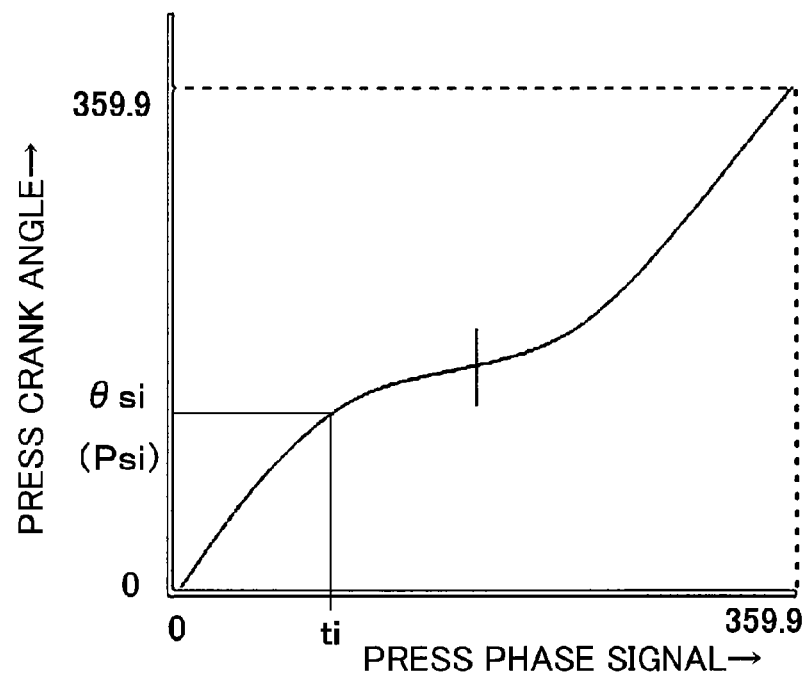
FIGS. 2A and 2B are timing charts for describing normal press operation control based on slide motion information and normal transfer control based on transfer motion information.

The slide motion information is graph information illustrated in FIG. 2A in which the horizontal axis indicates the step phase (i.e., press phase) and the vertical axis indicates the target slide position. The slide motion information corresponding to each servo press 10 is stored in the first information storage section 64A, and can be selected by operating the operation section 72. The selected slide motion information is loaded into a work memory (e.g., other memories).

In this embodiment, the step phase is an index 0 to 359.9 (time ti) that advances by 0.1 corresponding to one press cycle. The slide position Psi may be the actual vertical position of the slide 12. In this embodiment, the crank angle θsi (0 to 359.9°) at intervals of 0.1° is used as the slide position Psi based on the relationship with a slide drive mechanism (e.g., crank mechanism) of the servo press 10. In this embodiment, the slide position detection section that directly or indirectly detects the actual slide position Pi of the servo press 10 is formed by the encoder 23, the integral control section 61, and the control memory 63, and indirectly detects the actual slide position Pi as the crank angle θi. Note that the slide position detection section may directly detect the actual slide position Pi.

Figure 2B:
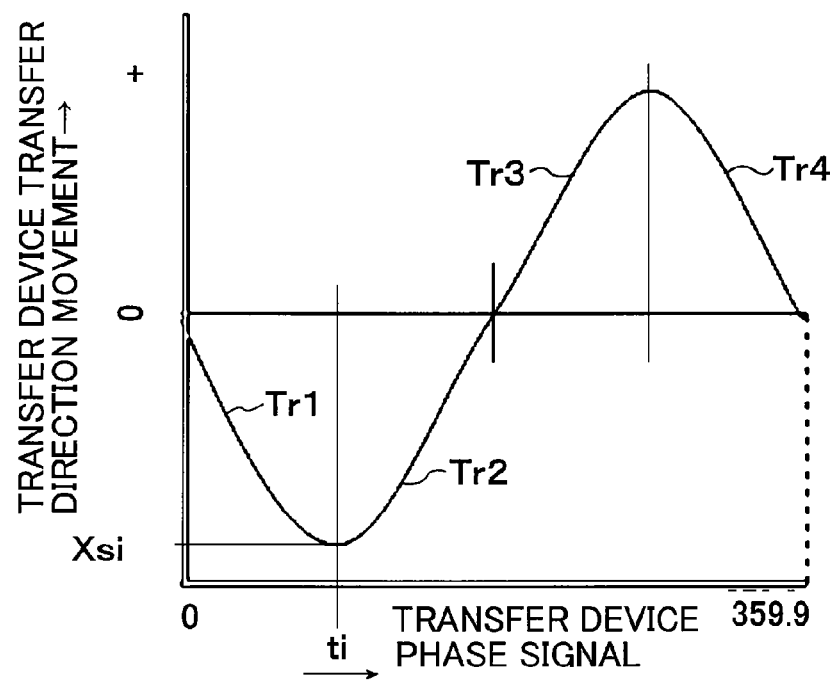

The position (θ0=0) of the slide 12 illustrated in FIG. 2A is equal to the bottom dead center illustrated in FIG. 3 for convenience taking account of the relationship with graph information illustrated in FIG. 2B. The step phase ti when θ0=0 is indicated by 0 (t0=0).

The transfer motion information of each servo transfer device 30 is graph information illustrated in FIG. 2B in which the horizontal axis indicates the step phase ti that is the same as the step phase ti (i.e., press phase) illustrated in FIG. 2A and the vertical axis indicates the target transfer position Xsi. The transfer motion information is stored in the second information storage section 64B, and can be selected by operating the operation section 72. The selected transfer motion information is loaded into a work memory (e.g., other memories) corresponding to the slide motion information.

The transfer motion information of each servo transfer device 30 may be created by an input operation using the operation section 72 referring to the display section 71. This also applies to the slide motion information.

The step phase of the transfer motion information is an index 0 to 359.9 that advances by 0.1 corresponding to one press cycle. Specifically, the step phase is the time ti. The target transfer position Xsi may be obtained by directly detecting the position of the servo transfer device 30 in the direction X. In this embodiment, a value obtained by processing the outputs Sxu and Sxd from the encoder 52 illustrated in FIG. 1 is used as the target transfer position Xsi since the detection range is wide, for example. Specifically, the transfer position detection section that directly or indirectly detects the actual transfer position of the servo transfer device 30 in the direction X is formed by the encoder 52, the integral control section 61, and the control memory 63, and indirectly detects the transfer position Xai. Note that the transfer position detection section may directly detect the actual transfer position of the servo transfer device 30.

Figure 13:
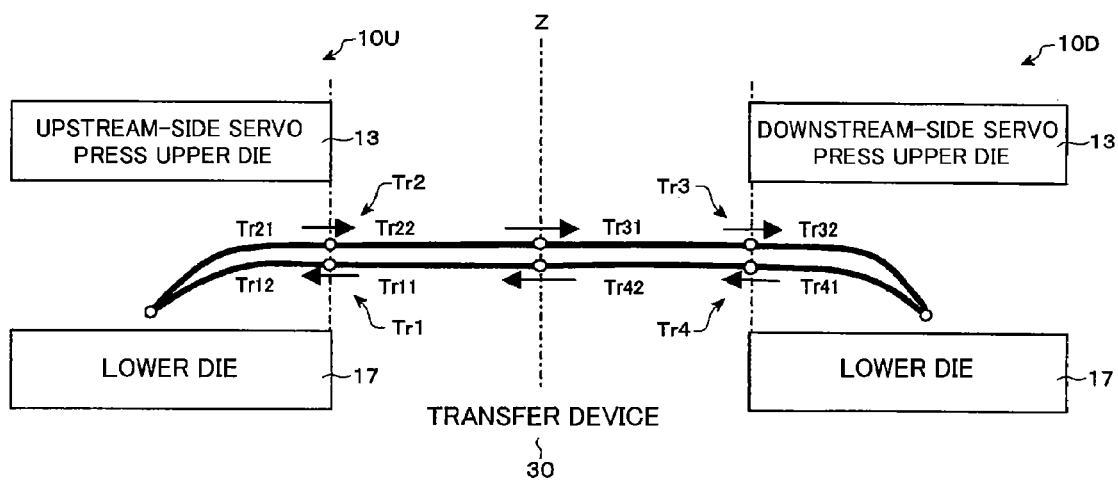
FIG. 13 is a diagram for describing a basic transfer step of a servo transfer device.

The transfer position Xi equal to the neutral position Z illustrated in FIGS. 12 and 13 is set at the zero position (0) for convenience taking account of the relationship with the graph information illustrated in FIG. 2A. Specifically, the transfer position Xi is a reference standby position.

The transfer position Xi is the position of the constituent section (rear end) of the downstream-side servo transfer device 30 in the direction X that first enters the space between dies 13 and 17 from the downstream side in the direction X during a transfer Tr1 in an empty state in which the workpiece 35 is not adsorbed (see FIG. 3A) (i.e., the position of the left side illustrated in FIG. 12). The transfer position Xi is the position of the constituent section (front end) of the upstream-side servo transfer device 30 in the direction X that is first removed from the space between the dies 13 and 17 toward the upstream side in the direction X during a transfer Tr4 in the empty state (see FIG. 3B) (i.e., the position of the right side illustrated in FIG. 12).

The transfer position Xi during a transfer Tr2 in a state in which the workpiece 35 is adsorbed is the position of the rear end of the workpiece 35 that is lastly removed from the space between the dies 13 and 17 toward the downstream side in the direction X (i.e., the position of the left side illustrated in FIG. 12). The transfer position Xi during a transfer Tr3 is the position of the front end of the workpiece 35 that first enters the space between the dies 13 and 17 (i.e., the position of the right side illustrated in FIG. 12). The transfer position Xi is thus defined from the viewpoint of preventing interference.

As illustrated in FIGS. 2B, 3A, and 13, the downstream-side servo transfer device 30D is transferred (empty transfer step Tr1 (=Tr11+Tr12)) from the neutral position Z illustrated in FIG. 13 toward the servo press 10U disposed on the upstream side. Specifically, the downstream-side servo transfer device 30D is transferred toward the upstream side in the direction X. In this case, the position of the slide 12 must be set to be higher than the height of the transfer path before the empty transfer step Tr12 between the upper and lower dies 13 and 17 illustrated in FIG. 13 starts. Specifically, when the upward movement step of the slide 12 is delayed due to a press failure or the like, the slide 12 may reach the height of the transfer path after the empty transfer step Tr12 has started. Interference cannot be prevented when such a situation occurs.

The downstream-side servo transfer device 30D is then transferred (workpiece transfer step Tr2 (=Tr21+Tr22)) toward the neutral position Z in a state in which the pressed workpiece 35 is adsorbed. Since the workpiece transfer step Tr21 is performed after the empty transfer step Tr12 has completed, the position of the slide 12 is higher than the height of the transfer path (i.e., equal to or higher than an upward movement interference escape position). Specifically, interference does not occur.

The servo transfer device that has functioned as the downstream-side servo transfer device 30D then functions as the upstream-side servo transfer device 30U. Specifically, the servo transfer device is transferred (workpiece transfer step Tr3 (=Tr31+Tr32)) from the neutral position Z in the direction X in order to transfer the pressed workpiece 35 to the downstream-side servo press 10D, as illustrated in FIG. 13 Since the workpiece transfer step Tr3 is performed after the empty transfer step Tr12 has completed, the position of the slide 12 is higher than the height of the transfer path (i.e., equal to or higher than the upward movement interference escape position). Therefore, interference does not occur.

After the upstream-side servo transfer device 30U has delivered the workpiece 35 to the lower die 17 of the downstream-side servo press 10D, the upstream-side servo transfer device 30U is transferred (empty transfer step Tr4 (=Tr41+ Tr42)) as illustrated in FIGS. 3B and 13, and returns to the neutral position Z. In this case, when the empty transfer step (Tr41) is delayed due to failure or the like, the transfer position still exists between the upper and lower dies 13 and 17. Therefore, interference necessarily occurs when the position of the slide becomes lower than a downward movement interference position while the slide downward movement step from the top dead center to the bottom dead center normally proceeds.

A servo press line operation method is described below.

Figure 6:
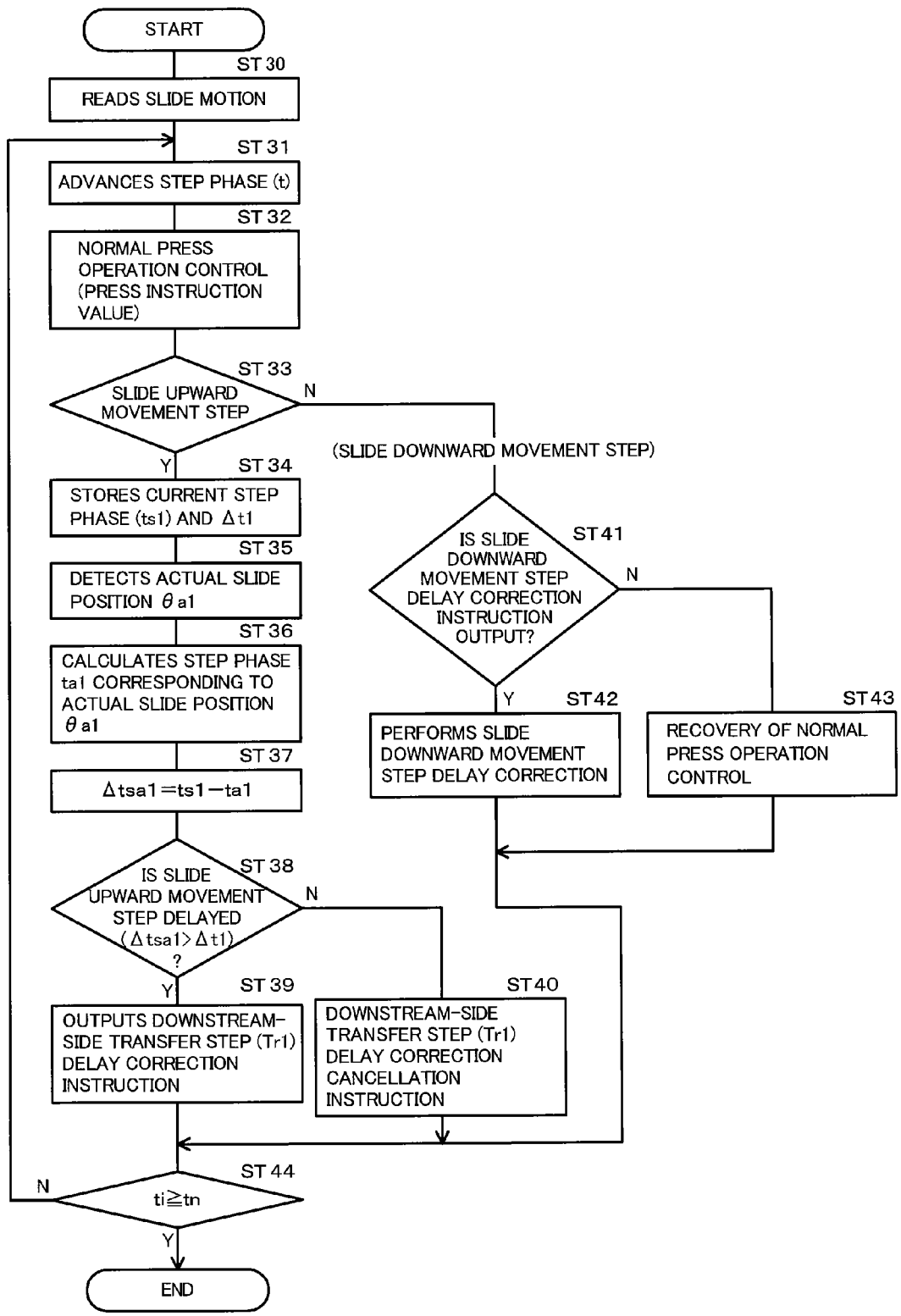
FIG. 6 is a flowchart for describing normal press operation control of a servo press, slide downward movement step delay correction control, and a transfer step delay correction instruction issued to a downstream-side servo transfer device.

The normal press operation control section 61 and 63 read the slide motion information (see FIG. 2A) corresponding to each servo press 10 selected from the first information storage section 64A illustrated in FIG. 1, load the slide motion information into the work area 62, and output the press operation control signal Scp (press instruction value) while causing the step phase ti based on the slide motion information to advance (ST30 to ST32 in FIG. 6). The normal press operation control section 61 and 63 then perform normal press operation control that adjusts the actual slide position θai (Pai) of the servo press 10 to the target slide position θsi corresponding to the current step phase (step phase ti) illustrated in FIG. 2A.

Specifically, the press controller 25 of the servo press 10 that has received the press operation control signal Scp (press instruction value) controls the rotation of the press motor 21 based on the press instruction value Scp (target value) and the signals Sp and Sv (feedback signals) from the encoder 22. The slide 12 is then moved upward and downward, and normal press operation control is performed (ST32).

Figure 4:
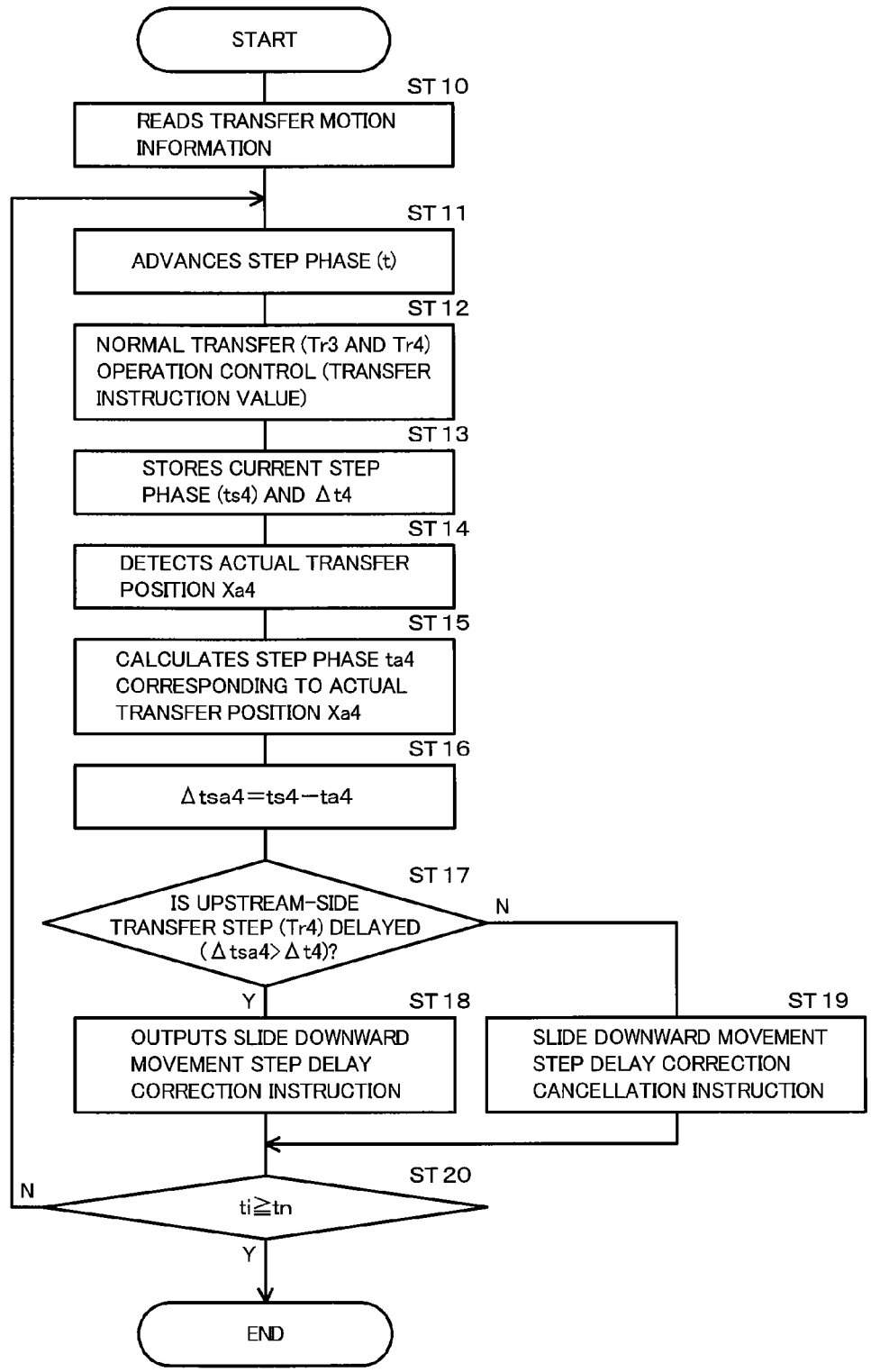
FIG. 4 is a flowchart for describing normal transfer operation control of an upstream-side servo transfer device and a slide downward movement step delay correction instruction.

The normal transfer operation control section 61 and 63 read the transfer motion information corresponding to the upstream-side servo transfer device 30U illustrated in FIG. 13 stored in the second information storage section 64B, load the transfer motion information into the work area 62, and output the transfer operation control signal Sctu (transfer instruction value) while causing the step phase ti based on the transfer motion information (the same as the step phase ti based on the slide motion information) to advance (ST10 to ST12 in FIG. 4). Specifically, the normal transfer operation control section 61 and 63 perform normal transfer operation control that adjusts the actual transfer position Xai to the target transfer position Xsi corresponding to the current step phase (step phase ti) illustrated in FIG. 2B.

The transfer controller 55 of the upstream-side servo transfer device 30U that has received the transfer operation control signal Sctu (transfer instruction value) controls the rotation of the transfer motor 51 based on the transfer instruction value Sctu (target value) and the signals Sp and Sv (feedback signals) from the encoder 52. The carrier 32 is then moved rightward and leftward, and normal upstream-side transfer operation control is performed (ST12).

Figure 8:
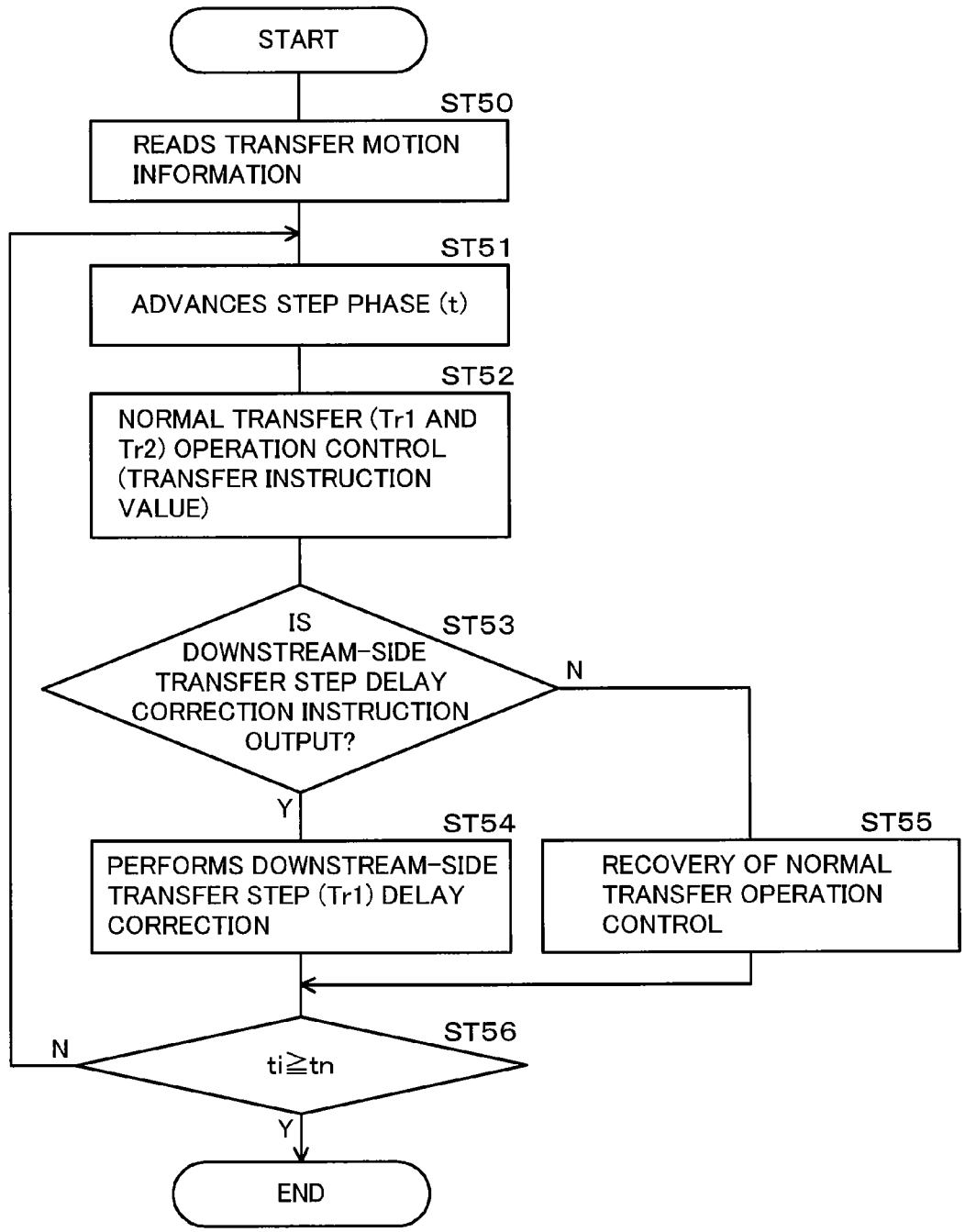
FIG. 8 is a flowchart for describing normal transfer operation control of a downstream-side servo transfer device and transfer step delay correction control.

Likewise, the normal transfer operation control section 61 and 63 perform normal downstream-side transfer operation control on the downstream-side servo transfer device 30D (ST50 to ST52 in FIG. 8).

The upstream-side transfer step delay determination section is then operated. The upstream-side transfer step delay determination section 61 and 63 determine whether or not the upstream-side transfer step is delayed using the current step phase ts when the slide is moved downward during press operation control and an apparent step phase ta calculated referring to the transfer motion information corresponding to the upstream-side servo transfer device 30U. The apparent step phase ta corresponds to the actual transfer position Xa detected at the current time. In this embodiment, a delay in the transfer step Tr41 in which the transfer position of the upstream-side servo transfer device 30U exists between the upper and lower dies 13 and 17 of the servo press 10 is determined. It is impossible to prevent interference when determining a delay in the transfer step Tr42 in which the transfer position of the upstream-side servo transfer device 30U does not exist between the upper and lower dies 13 and 17. Note that a delay in the transfer step Tr32 in which the transfer position of the upstream-side servo transfer device 30U exists between the upper and lower dies 13 and 17 may be determined.

Specifically, the upstream-side transfer step delay determination section 61 and 63 read the step phase (e.g., ts4) at a time (e.g., t4) during normal transfer operation control (Tr3 and Tr4) referring to (B) in FIG. 5, and store the step phase in the work area of the storage section 62 (ST13 in FIG. 4). The upstream-side transfer step delay determination section 61 and 63 cause the transfer position detection section 52, 61, and 63 to detect the actual transfer position Xa4 (ST14). The upstream-side transfer step delay determination section 61 and 63 then calculate the step phase ta4 (apparent step phase) of the upstream-side transfer step corresponding to the actual transfer position Xa4 by utilizing the transfer motion information (see dotted line of (B) in FIG. 5) (ST15). The upstream-side transfer step delay determination section 61 and 63 then determine whether or not the upstream-side transfer step Tr41 is delayed using the current step phase ts4 and the apparent step phase ta4.

The upstream-side transfer step delay determination section 61 and 63 may determine that the upstream-side transfer step Tr41 is delayed when the step phase relationship is ta4<ts4. In this embodiment, the upstream-side transfer step delay determination section 61 and 63 calculate the difference Δtsa4 (=ts4−ta4) between the step phase ts4 and the apparent step phase ta4 (ST16), and determine that the upstream-side transfer step Tr41 is delayed when the calculated difference Δtsa4 is larger than a second allowable phase range Δt4 set in advance (Δtsa4>Δt4) (ST17). The allowable phase range Δt4 is selected, set, and stored based on an allowable value during normal transfer operation, and is temporarily stored in the work memory in the step ST13.

The current position (θi=Pi) of the slide 12 is equal to a target position θs4 corresponding to the current step phase ti (=ts4) illustrated in (A) in FIG. 5. The target position θs4 is lower (e.g., closer to the bottom dead center) than the actual position θa4 corresponding to the apparent step phase ta4. Therefore, the slide 12 may enter (e.g., may be moved downward into) the downward movement interference area (i.e., interference may occur) in a period in which the rear end of the upstream-side servo transfer device 30U is positioned between the upper and lower dies 13 and 17 during the empty transfer step Tr4 or Tr41 (see FIG. 3B).

The slide downward movement step delay correction instruction section and the slide downward movement step delay correction control section are operated in order to prevent such a situation.

Specifically, the slide downward movement step delay correction instruction section 61 and 63 output a correction instruction that delays the slide downward movement step from the top dead center to the bottom dead center to the servo press 10 disposed on the downstream side of the upstream-side servo transfer device 30U in the direction X (ST18 in FIG. 4). Specifically, the slide downward movement step delay correction instruction section 61 and 63 instruct the servo press 10 to increase the time required for the slide 12 to reach a position equal to or lower than the downward movement interference position illustrated in FIG. 3B. When the slide downward movement step delay correction control section 61 and 63 have confirmed that the instruction has been received during the downward movement of the slide (NO in ST33 in FIG. 6) (YES in ST41), the servo press 10 causes the slide downward movement step delay correction control section 61 and 63 to perform a delay correction (ST42).

The slide downward movement step delay correction may be implemented by returning the current step phase ts4 illustrated in FIG. 5 to the apparent step phase ta4 and returning the slide position to the slide position (crank angle θa4) corresponding to the actual transfer position Xa4 of the upstream-side servo transfer device 30U.

It is technically possible to temporarily move the slide 12 upward by reversely rotating the press motor 21. However, since the transfer step Tr41 is continuously performed during this operation, it may be meaningless to actually move the slide 12 upward. In particular, since the slide 12 must be moved downward after moving the slide 12 upward, the productivity decreases to a large extent. Specifically, it is not desirable to move the slide 12 upward.

In this embodiment, since the transfer step Tr41 is continuously performed even with a delay corresponding to the step phase ti, the servo press 10 is formed so that the operation speed can be temporarily reduced while controlling the operation corresponding to the step phase ti. Specifically, the servo press 10 waits for the transfer step Tr41 to catch up with the slide operation. The deceleration rate or the deceleration time can be set at a value proportional to the difference Δtsa4. Note that the slide downward movement step delay correction is not limited to the above-described deceleration method. For example, the slide may be temporarily stopped once or several times.

The servo characteristics change due to load (e.g., a variation in press load or workpiece weight) or a mechanical or electrical failure of the press or the transfer device. However, a change in the servo characteristics of the servo press 10 and the servo transfer device 30 rarely repeats in each cycle. If a change in servo characteristics repeats in each cycle, integral control measures may be taken in advance.

The invention effectively utilizes a phenomenon in which the slide position θi and the transfer position Xi return to the state θsi and the state Xsi corresponding to the step phase tsi while the operation speed of the slide downward movement step of the servo press 10 is reduced by the slide downward movement step delay correction. Specifically, the invention utilizes a phenomenon in which the delay is automatically canceled (NO in ST17 in FIG. 4).

Specifically, when the slide downward movement step delay correction cancellation instruction section 61 and 63 have confirmed that the delay in the transfer step Tr41 has been canceled (Δtsa4≦Δt4) (NO in ST17), the slide downward movement step delay correction cancellation instruction section 61 and 63 issue a cancellation instruction (ST19). When the servo press 10 has received the cancellation instruction (NO in ST41 in FIG. 6), recovery control section 61 and 63 of the servo press 10 cancel the deceleration operation (ST43) to recover the normal press operation by the normal press operation control section 61 and 63 (ST32).

Note that the slide downward movement step delay correction cancellation instruction section 61 and 63 may monitor the output signal Sxu from the encoder 52 of the upstream-side servo transfer device 30U, and output the slide downward movement step delay correction cancellation instruction when the downward movement step delay correction cancellation instruction section 61 and 63 have confirmed that the actual transfer position Xa4 is outside the interference area in the direction X (e.g., has exited the space between the upper and lower dies). Specifically, the slide downward movement step delay correction cancellation instruction section may be formed by interference area escape confirmation section 61 and 63.

When the step phase ti has reached tn (=359.9) with regard to the upstream-side servo transfer device 30U (FIG. 4) and the servo press 10 (FIG. 6), one cycle ends (YES in ST20 in FIG. 4 and YES in ST44 in FIG. 6). This also applies to FIG. 8 (YES in ST56).

The press step delay determination section 61 and 63 read the current step phase (e.g., ts1) at a time (e.g., t1) during normal transfer operation control (Tr1 and Tr2) and the slide upward movement step (YES in ST33 in FIG. 6) referring to FIG. 7, and store the current step phase in the work area of the storage section 62 (ST34). The press step delay determination section 61 and 63 cause the slide position detection section 23, 61, and 63 to detect the actual slide position θa1 (ST35).

The press step delay determination section 61 and 63 then calculates the step phase ta1 (apparent step phase) corresponding to the detected actual slide position θa1 (ST36). The slide upward movement step delay determination section 61 and 63 then determine whether or not the slide upward movement step is delayed using the current step phase ts1 and the apparent step phase ta1 during the upward movement of the slide during press operation control. The apparent step phase ta1 is calculated referring to the slide motion information (see dotted line in (A) in FIG. 7).

The slide upward movement step delay determination section 61 and 63 may determine that the slide upward movement step is delayed when the step phase relationship is ta1<ts1. In this embodiment, the slide upward movement step delay determination section 61 and 63 calculate the difference Δtsa1 (=ts1−ta1) between the step phase ts1 and the apparent step phase ta1 (ST37), and determine that the slide upward movement step is delayed when the calculated difference Δtsa1 is larger than a first allowable phase range (Δt1) set in advance (Δtsa1>Δt1) (YES in ST38). The allowable phase range Δt2 is selected, set, and stored based on an allowable value during normal press operation, and is temporarily stored in the work memory in the step ST34.

The current position (θi=Pi) of the slide 12 is equal to the target position θs1 corresponding to the current step phase ti (=ts1) illustrated in (A) in FIG. 7. The target position θs1 is higher (e.g., closer to the top dead center) than the actual position θa1 corresponding to the apparent step phase ta1. Therefore, the rear end of the downstream-side servo transfer device 30D in the empty transfer step Tr1 (Tr11) may enter the space between the upper and lower dies 13 and 17 (i.e., interference may occur) even though the slide 12 has not moved upward to the height of the empty transfer path (to a position equal to or higher than the upward movement interference escape position) (see FIG. 3A).

The downstream-side transfer step delay correction instruction section and the downstream-side transfer step delay correction control section are operated in order to prevent such a situation.

Specifically, when the slide upward movement step from the bottom dead center to the top dead center has been determined to be delayed (YES in ST38 in FIG. 6), the downstream-side transfer step delay correction instruction section 61 and 63 output a correction instruction that causes the transfer step Tr11 of the servo transfer device 30D disposed on the downstream side of the servo press 10 to be delayed as compared with normal transfer operation control (ST39). Specifically, the downstream-side transfer step delay correction instruction section 61 and 63 instruct an increase in the time required for the slide 13 illustrated in FIG. 3A to move upward to a sufficient height. Specifically, the downstream-side transfer step delay correction instruction section 61 and 63 instruct an increase in the time required for the servo transfer device to enter the space between the upper and lower dies illustrated in FIG. 3A. When the downstream-side servo transfer device 30D has received the instruction and the downstream-side transfer step delay correction control section 61 and 63 have confirmed that the instruction has been received (YES in ST53 in FIG. 8), the downstream-side transfer step delay correction control section 61 and 63 perform a delay correction (ST54).

The downstream-side transfer step delay correction may be implemented by returning the current step phase ts1 illustrated in FIG. 7 to the apparent step phase ta1 and returning the transfer position to the transfer position Xa1 corresponding to the actual slide position (crank angle θa1) of the servo press 10.

It is logically possible to temporarily return the object 32 in the direction X by reversely rotating the transfer motor 51. However, it is difficult to implement this operation from the relationship between the inertia and the motor capacity. It is impossible to implement this operation in practice. However, since the slide upward movement step is continuously performed during this operation, it may be meaningless to move the object 32 in the opposite direction. In particular, when the object 32 has been moved rightward in the direction X, for example, the object 32 must be moved leftward so that the productivity decreases. Moreover, vibrations, deformation of the instrument, and the like may occur. Specifically, it is disadvantageous to move the object 32 in the opposite direction.

In this embodiment, since the slide upward movement step is continuously performed even with a delay corresponding to the step phase ti, the downstream-side servo transfer device 30D is formed so that the operation speed can be temporarily reduced while controlling the operation corresponding to the step phase ti. Specifically, the downstream-side servo transfer device 30D waits for the slide 12 to move to a position equal to or higher than the height of the transfer Tr1 (Tr11) path. The deceleration rate or the deceleration time can be set at a value proportional to the difference Δtsa1. Note that the downstream-side transfer step delay correction is not limited to the above-described deceleration method. For example, the transfer device may be temporarily stopped once or several times.

In the invention, the slide position θi and the transfer position Xi return to the state θsi and the state Xsi corresponding to the step phase tsi while the operation speed of the empty transfer step Tr11 is reduced by the downstream-side transfer step delay correction. Specifically, the invention utilizes a phenomenon in which the delay in the slide upward movement step is automatically canceled. Specifically, when the downstream-side transfer step delay correction cancellation instruction section 61 and 63 have confirmed that the delay in the slide upward movement step has been canceled (Δtsa1≦Δt1) (NO in ST38 in FIG. 6), the downstream-side transfer step delay correction cancellation instruction section 61 and 63 issue a cancellation instruction (ST40). When the servo transfer device 30D has received the cancellation instruction (NO in ST53 in FIG. 8), recovery control section 61 and 63 of the servo transfer device 30D cancel the deceleration operation (ST55) to recover the normal transfer operation by the normal transfer operation control section 61 and 63 (ST52).

Note that the downstream-side transfer step delay correction cancellation instruction section 61 and 63 may monitor the output signal Sθ from the encoder 23 of the servo press 10, and output a delay correction cancellation instruction for the downstream-side transfer step Tr11 when it has been confirmed that the actual slide position θa1 has moved to a position equal to or higher than the upward movement interference escape position, for example. Specifically, the downstream-side transfer step delay correction cancellation instruction section may be formed by interference area escape position confirmation section 61 and 63.

As described above, the servo press line operation control method characterized in that a correction that causes the transfer step Tr11 of the downstream-side servo transfer device 30D of the servo press 10 to be delayed as compared with the normal transfer operation is performed when the slide upward movement step has been determined to be delayed using the current step phase ts1 during the upward movement of the slide during normal press operation control and the apparent step phase ta1 corresponding to the actual slide position θa1 (YES in ST38 in FIG. 6), and a correction that causes the slide downward movement step to be delayed as compared with the normal press operation is performed when the upstream-side transfer step Tr41 has been determined to be delayed using the current step phase ts4 during the downward movement of the slide and the apparent step phase ta4 corresponding to the actual transfer position Xa4 of the upstream-side servo transfer device 30U (YES in ST17 in FIG. 4), can be implemented reliably and smoothly.

The host controller 60 integrally controls each servo press 10 and each servo transfer device 30 from the viewpoint of improving the productivity of the entire servo press line. Therefore, even if the slide upward movement step of the servo press 10 is delayed or the transfer step Tr41 of the servo transfer device 30U (upstream side) is delayed in the press cycle or the transfer cycle, integral control is not impaired due to such a change. Therefore, operation control stability of the entire press line is achieved.

When the slide upward movement step is delayed, the downstream-side transfer step Tr11 is delayed. Specifically, the transfer step is decelerated until the slide 12 is moved upward to a position equal to or higher than a given height, and the downstream-side transfer step Tr11 is then returned to the normal transfer step. Specifically, a speed mismatch is automatically corrected by an individual control method that locally monitors an arbitrary servo press 10 and the servo transfer device 30D disposed on the downstream side of the servo press 10. This reliably prevents interference. Since a delay in the slide upward movement step does not occur in each cycle, the productivity is affected to only a small extent.

When the upstream-side transfer step Tr41 is delayed, the slide downward movement step is delayed. Specifically, the slide downward movement step is returned to the normal downward movement operation when the delay in the empty transfer step Tr41 of the upstream-side servo transfer device 30U has been canceled (or, after the rear end of the upstream-side servo transfer device 30U has been removed from the space between the upper and lower dies) due to deceleration of the servo press 10. Specifically, a speed mismatch is automatically corrected by an individual control method that monitors an arbitrary upstream-side servo transfer device 30U and the servo press 10D disposed on the downstream side of the upstream-side servo transfer device 30U. This reliably prevents interference.

Since the relatively low-speed servo transfer device 30 can be subjected to a transfer operation in a top speed mode and the relatively high-speed servo press 10 can perform a press operation at a slide speed (cycle) corresponding to the transfer operation of the servo transfer device 30 in the top speed mode in order to maximize productivity, the transfer speed and the slide speed do not become higher than those of the normal operation. Specifically, since interference can be prevented by the individual control methods for the downstream-side transfer step and the slide downward movement step (i.e., delay correction), integral control is not affected to a large extent.

When the empty transfer step Tr1 (Tr11), the workpiece transfer step Tr2, and the workpiece transfer step Tr3 in FIG. 3B of the servo transfer device 30 (see FIG. 3B) are delayed, interference does not occur since the slide 12 has moved to a position equal to or higher than the upward movement interference escape position by the scheduled time. When the downward movement step of the servo press 10 toward the downward movement interference position (see FIG. 3B) is delayed, interference does not occur although a speed margin occurs in the empty transfer step Tr4 (tr41).

According to this embodiment, since the servo press line operation method according to the invention can be implemented reliably and smoothly, interference can be reliably prevented while maximizing press productivity.

Since the servo press line operation control device is formed so that the normal press operation control section can perform normal press operation control so that the actual slide position θa is adjusted to the target slide position θs corresponding to the current step phase, the normal transfer operation control section can perform normal transfer operation control so that the actual transfer position Xa is adjusted to the target transfer position Xs corresponding to the current step phase, the downstream-side transfer step delay correction control section can delay the downstream-side transfer step when the upward movement step delay determination section has determined that the slide upward movement step is delayed, and the slide downward movement step delay correction control section can delay the slide downward movement step when the upstream-side transfer step delay determination section has determined that the upstream-side transfer step is delayed, the servo press line operation control device can be easily implemented and allows simple handling.

Moreover, since the servo press line operation control device is formed so that the upward movement step can be determined to be delayed when the difference between the current step phase and the apparent step phase is larger than the first set phase range Δt1 and the upstream-side transfer step can be determined to be delayed when the difference between the current step phase and the apparent step phase is larger than the second set phase range Δt4, more stable slide upward/downward movement control and transfer control can be performed.

Since interference can be prevented by an individual control method, the servo press line operation control device can be flexibly employed for an arbitrary servo press line irrespective of the types and the structures of the servo press 10 and the servo transfer device 30. Therefore, the servo press line operation control device has high industrial applicability.

This embodiment is similar to the above embodiment (FIG. 1 to 8) as to the basic configuration and function, but differs from the above embodiment in that interference between the upstream-side and downstream-side servo transfer devices 30U and 30D can be reliably prevented even when the workpiece transfer step Tr3 (particularly Tr32) of the upstream-side servo transfer device 30U that transfers the workpiece to the lower die 17 ends immediately after the workpiece transfer step Tr2 (particularly Tr21) of the downstream-side servo transfer device 30D that transfers the workpiece from the lower die 17 (see FIG. 3A).

Figure 9:
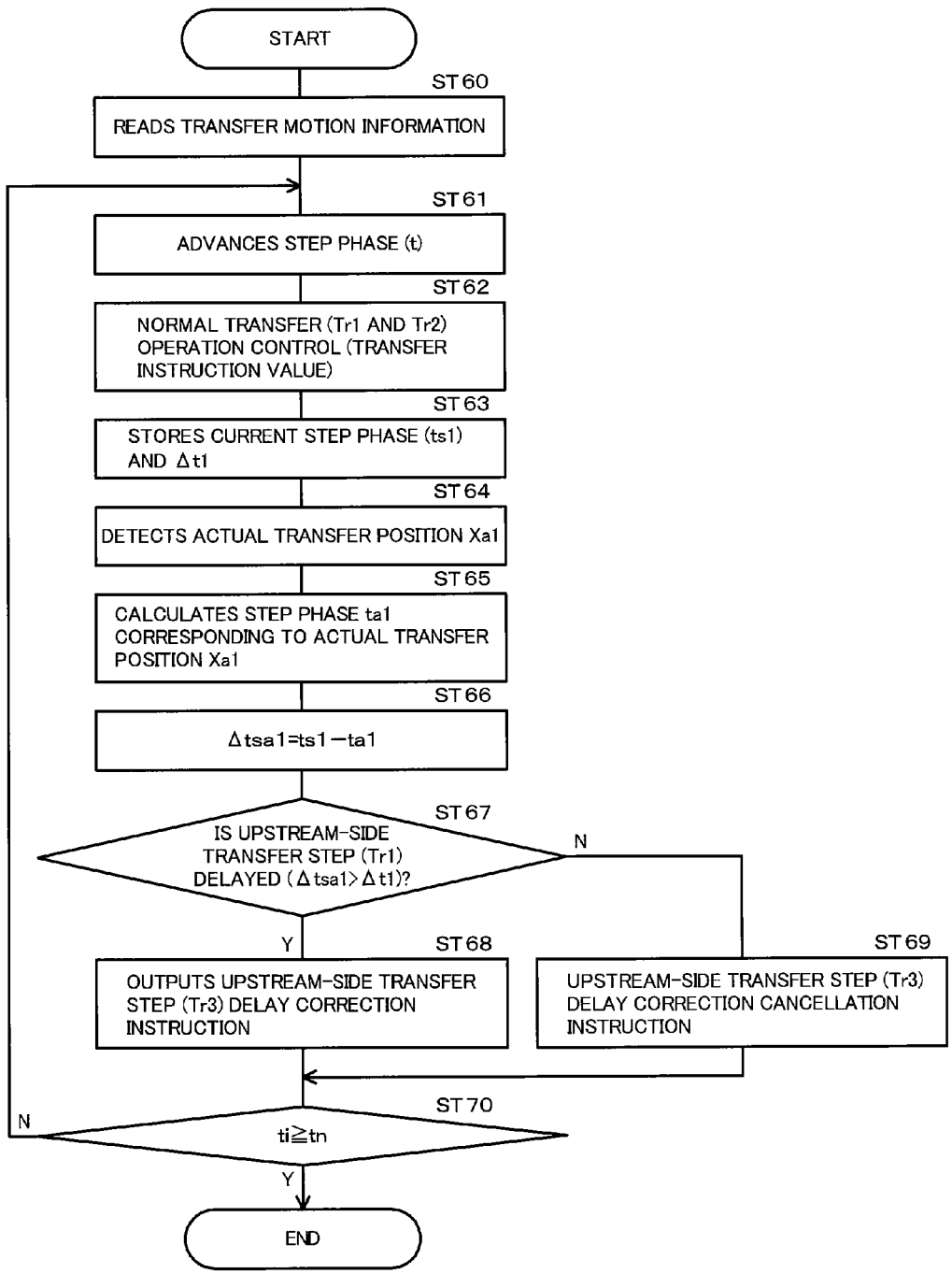
FIG. 9 is a flowchart for describing normal transfer operation control of a downstream-side servo transfer device and a transfer step delay correction instruction issued to an upstream-side servo transfer device according to a second embodiment of the invention.
Figure 10:
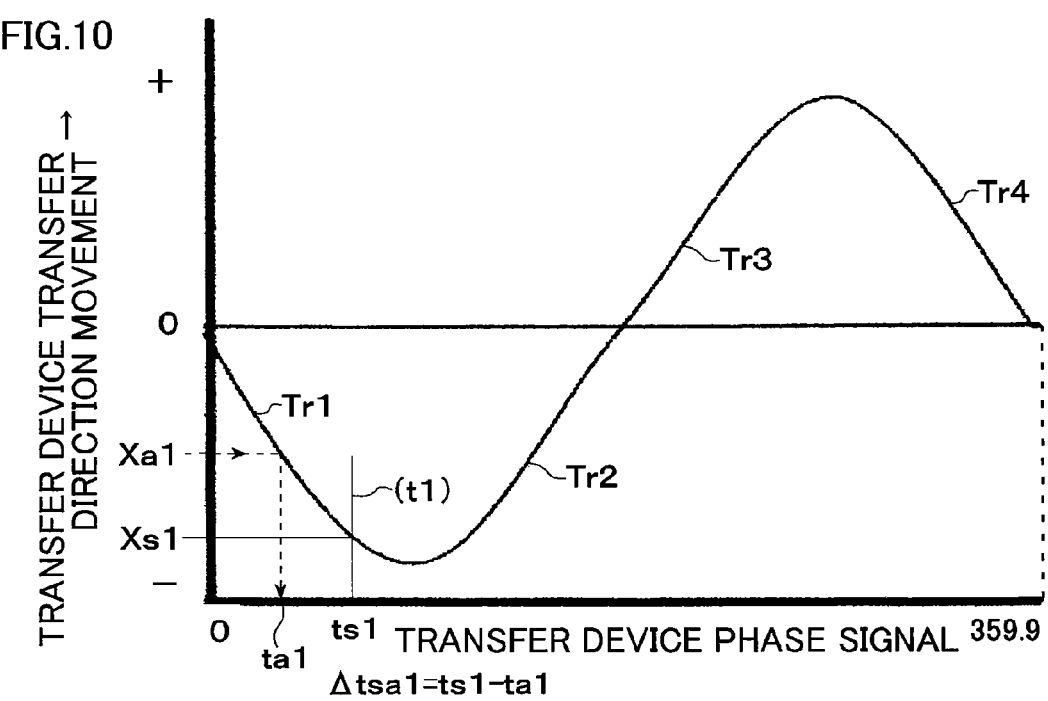
FIG. 10 is a timing chart for describing a method of determining a delay in a transfer step of a downstream-side servo transfer device.

The normal transfer operation control section 61 and 63 for the downstream-side servo transfer device 30D read transfer motion information illustrated in FIG. 10, load the transfer motion information into the work area 62, and output the transfer operation control signal Sctd (transfer instruction value) while causing the step phase ti to advance (ST60 to ST62 in FIG. 9). Specifically, the normal transfer operation control section 61 and 63 perform normal transfer operation control that adjusts the actual transfer position Xa1 to the target transfer position Xsi corresponding to the current step phase (step phase t1) illustrated in FIG. 10.

The transfer controller 55 of the downstream-side servo transfer device 30D that has received the transfer operation control signal Sctd (transfer instruction value) controls the rotation of the transfer motor 51 based on the transfer instruction value Sctd (target value) and the signals Sp and Sv (feedback signals) from the encoder 52. The carrier 32 is then moved rightward and leftward, and normal downstream-side transfer operation control is performed (ST62).

Figure 11:
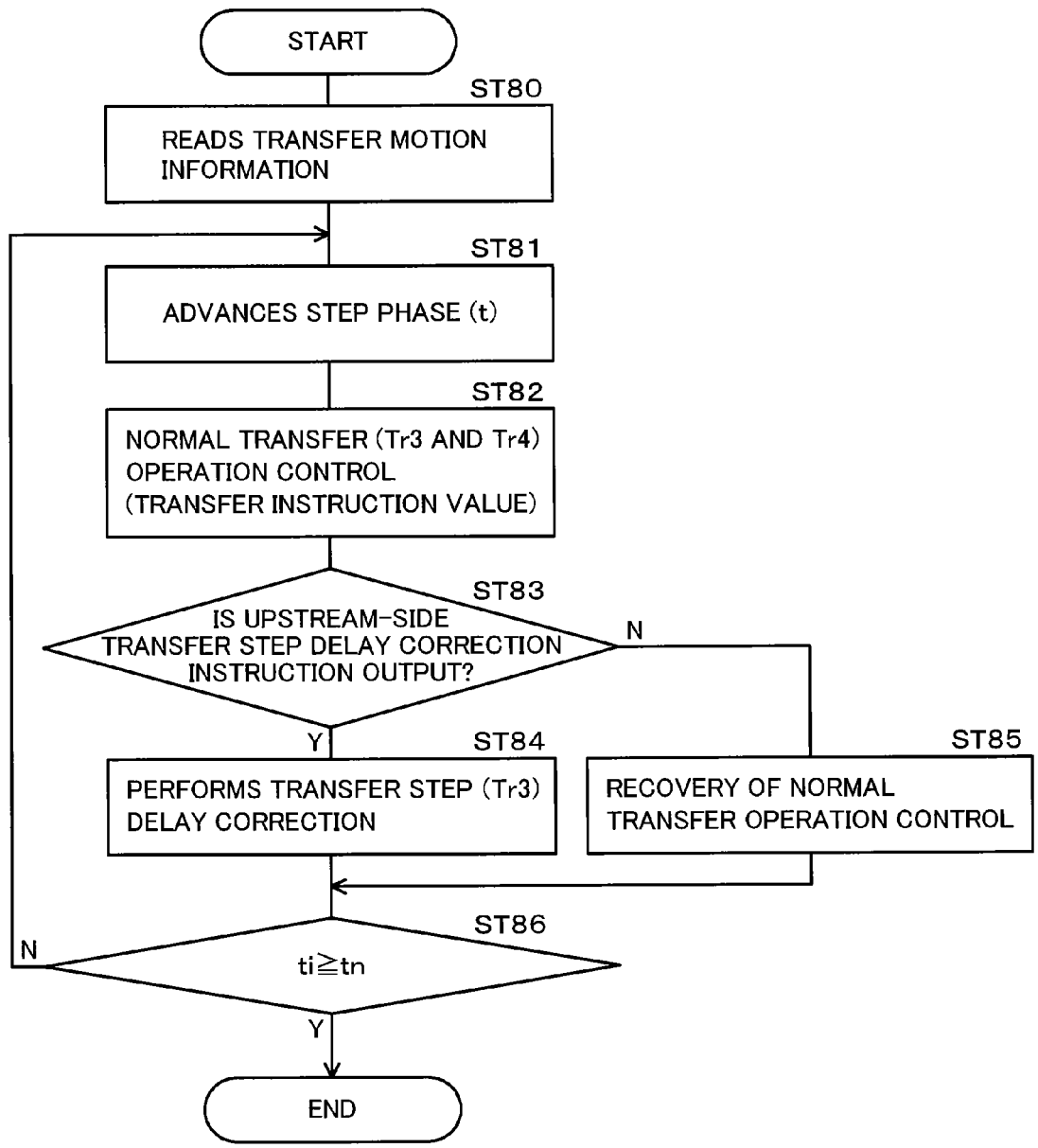
FIG. 11 is a flowchart for describing normal transfer operation control of a downstream-side servo transfer device and transfer step delay correction control.

Likewise, the normal transfer operation control section 61 and 63 for the upstream-side servo transfer device 30U perform normal upstream-side transfer operation control (ST80 to ST82 in FIG. 11).

The downstream-side transfer step delay determination section 61 and 63 read the step phase ts1 at the time t1 during empty transfer operation control (Tr12 and/or Tr11) before the normal workpiece transfer step Tr2 (Tr21) referring to FIG. 10, and store the step phase ts1 in the work area (storage section 62) (ST63 in FIG. 9). The downstream-side transfer step delay determination section 61 and 63 cause the transfer position detection section 52, 61, and 63 to detect the actual transfer position Xa1 (ST64).

The downstream-side transfer step delay determination section 61 and 63 then calculate the apparent step phase ta1 of the downstream-side transfer step Tr1 corresponding to the actual transfer position Xa1 utilizing the transfer motion information (see dotted line in FIG. 10). The downstream-side transfer step delay determination section 61 and 63 then determine whether or not the downstream-side transfer step Tr12 is delayed using the step phase ts1 and the apparent step phase ta1 during control.

In this embodiment, the downstream-side transfer step delay determination section 61 and 63 determine that the downstream-side transfer step Tr12 is delayed when the difference Δtsa1 (=ts1−ta1) between the current step phase ts1 and the apparent step phase ta1 calculated in the step ST66 is larger than a third allowable phase range Δt1 set in advance (YES in ST67). The allowable phase range Δt1 is selected, set, and stored based on an allowable value during normal transfer operation, and is temporarily stored in the work memory in the step ST63. The downstream-side transfer step delay determination section 61 and 63 may determine that the downstream-side transfer step Tr12 is delayed when the phase relationship is ta1<ts1.

The current step phase of the downstream-side servo transfer device 30D should be the step phase ts1 illustrated in FIG. 10, and the transfer position should be equal to the target position Xs1. However, the actual transfer position is the detected transfer position Xa1. The step phase corresponding to the actual transfer position Xa1 is the apparent step phase ta1. The apparent step phase ta1 is delayed with respect to the step phase ts1.

Therefore, the workpiece transfer step Tr3 (Tr32) of the upstream-side servo transfer device 30U may proceed before the rear end of the downstream-side servo transfer device 30D during the empty transfer step Tr1 (Tr11) (see FIG. 3A) reaches the lower die 17 or the workpiece transfer step Tr2 (Tr21) starts so that the front end of the workpiece 35 may enter the space between the upper and lower dies. In this case, the transfer devices or the workpieces collide (i.e., interference occurs).

In order to prevent such a situation, the upstream-side transfer step delay correction instruction section 61 and 63 output a correction instruction that delays the transfer step Tr3 (Tr31 and/or Tr32) of the upstream-side servo transfer device 30U (ST68). Specifically, the upstream-side transfer step delay correction instruction section 61 and 63 instruct an increase in the time required for the front end of the workpiece 35 to reach the lower die 17. When the upstream-side servo transfer device 30U has received the instruction and the upstream-side transfer step delay correction control section 61 and 63 have confirmed that the instruction has been received (YES in ST83 in FIG. 11), the upstream-side transfer step delay correction control section 61 and 63 perform a delay correction (ST84).

It is difficult to temporarily return the object 32 to the upstream side in the direction X by reversely rotating the transfer motor 51 for the reasons described above. Specifically, a decrease in productivity or vibrations or the like may occur. Therefore, since the downstream-side transfer step Tr2 (Tr21) is continuously performed even with a delay, the upstream-side servo transfer device 30U is formed so that the operation speed of the upstream-side transfer step Tr3 (Tr31 and Tr32) can be temporarily reduced while controlling the operation corresponding to the step phase ti.

Specifically, the upstream-side servo transfer device 30U waits for the workpiece 35 to be removed from the lower die 17 due to the progress of the downstream-side transfer step Tr2 (Tr21). The deceleration rate or the deceleration time can be set at a value proportional to the difference $\Delta tsa1$ (=ts1−ta1). Note that the upstream-side transfer step delay correction is not limited to the above-described deceleration method. For example, the transfer device may be temporarily stopped once or several times.

The invention effectively utilizes a phenomenon in which the downstream-side transfer position Xi returns to the state Xsi corresponding to the step phase tsi while the operation speed of the workpiece transfer step Tr3 is reduced by the upstream-side transfer step delay correction. Specifically, the delay in the downstream-side transfer step Tr2 (Tr21) is automatically canceled. Specifically, when the upstream-side transfer step delay correction cancellation instruction section 61 and 63 have confirmed that the delay in the workpiece transfer step Tr21 has been canceled ($\Delta tsa1 \leq \Delta t1$) (NO in ST67), the upstream-side transfer step delay correction cancellation instruction section 61 and 63 issue a cancellation instruction (ST69). Note that the upstream-side transfer step delay correction cancellation instruction section may be formed by interference area escape confirmation section 61 and 63 in the same manner as in the first embodiment.

When the upstream-side servo transfer device 30U has received the cancellation instruction (NO in ST83 in FIG. 11), recovery control section 61 and 63 of the upstream-side servo transfer device 30U cancel the deceleration operation (ST85) to recover the normal transfer operation by the normal transfer operation control section 61 and 63 (ST82).

When the step phase ti has reached tn (=359.9) with regard to the downstream-side servo transfer device 30D illustrated in FIG. 9 and the upstream-side servo transfer device 30U illustrated in FIG. 11, one cycle ends (YES in ST70 in FIG. 9 and YES in ST86 in FIG. 11).

In this embodiment, even if the upward movement step and the downward movement step of the servo press 10 (slide 12) are normally performed, when the downstream-side empty transfer step Tr1 (Tr11 and/or Tr12) (see FIG. 3A) is delayed so that the workpiece transfer step Tr2 (Tr21) is delayed, or the workpiece transfer step Tr2 (Tr21) is delayed due to a delay in the empty transfer step Tr2, the front end of the upstream-side servo transfer device 30U interferes with the rear end of the downstream-side servo transfer device 30D on the lower die 17 if the upstream-side workpiece transfer step Tr3 is normally performed. In this case, the workpiece transfer step (Tr3) is decelerated until the workpiece transfer step Tr2 of the downstream-side servo transfer device 30D advances and the rear end of the downstream-side servo transfer device 30D is removed from the lower die 17 in the direction X, and the workpiece transfer step Tr3 is then returned to the normal downward movement step.

Specifically, a speed mismatch between the upstream-side servo transfer device 30U and the downstream-side servo transfer device 30D is automatically corrected by an individual control method that locally monitors the upstream-side servo transfer device 30U and the downstream-side servo transfer device 30D disposed on either side of an arbitrary servo press 10 so that interference during the transfer step can be reliably prevented.

According to this embodiment, the same effects as those of the above embodiment can be achieved while further reliably preventing interference between the servo transfer devices 30U and 30D.

Note that the servo press line can be operated utilizing a correction between the upstream-side and the downstream-side servo transfer devices 30U and 30D without performing a correction for the servo press 10 under conditions where a delay in the slide upward movement step and the slide downward movement step of the servo press 10 rarely occurs (e.g., when the load is very small with respect to the capacity of the servo press 10). Therefore, the application range can be further increased.

The invention can contribute to providing a servo press line that can perform a press operation while reliably preventing interference between the servo press and the servo transfer device or the workpiece and maximizing productivity.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A method of operating a servo press line in which a servo press having a slide and servo transfer devices are alternately disposed in a workpiece transfer direction, the method comprising the steps of:

performing a normal press operation that adjusts a slide position of the servo press to a target slide position corresponding to a first step phase that is based on slide motion information while causing the first step phase to advance, and performing a normal transfer operation that adjusts a transfer position of the workpiece of each of the servo transfer devices to a target transfer position corresponding to a second step phase that is based on transfer motion information while causing the second step phase to advance, the second step phase being the same as the first step phase;

performing a correction that delays a transfer step of one of the servo transfer devices disposed on a downstream side of the servo press as compared with the normal transfer operation when a slide upward movement step has been determined to be in a delayed state based on a current first step phase in slide upward movement and an apparent first step phase corresponding to a current actual slide position, the apparent first step phase having been calculated from the slide motion information; and performing a correction that delays a slide downward movement step of the servo press as compared with the normal press operation when an upstream-side transfer step has been determined to be in a delayed state based on a current second step phase in slide downward movement and an apparent second step phase corresponding to a current actual transfer position of the workpiece, the apparent second step phase having been calculated from the transfer motion information of the servo transfer device disposed on an upstream side of the servo press.

2. A servo press line operation control device in which a servo press having a slide and servo transfer devices are alternately disposed in a workpiece transfer direction, the operation control device comprising:

a first information storage section that stores slide motion information in which a first step phase is associated with a target slide position;

a normal press operation control section that controls a normal press operation so that a slide position of the servo press is adjusted to a target slide position corresponding to a current first step phase while causing the first step phase that is based on the slide motion information stored in the first information storage section to advance;

a second information storage section that stores transfer motion information in which a second step phase is associated with a target transfer position, the second step phase being the same as the first step phase based on the slide motion information;

a normal transfer operation control section that controls a normal transfer operation so that a transfer position of the workpiece of each of the servo transfer devices is adjusted to a target transfer position corresponding to a current second step phase while causing the second step phase that is based on the transfer motion information stored in the second information storage section to advance;

a slide position detection section that directly or indirectly detects an actual slide position of the servo press;

a first determination section that determines whether or not a slide upward movement step is in a delayed state based on a current first step phase in slide upward movement during the normal press operation and an apparent first step phase corresponding to the detected current actual slide position, the apparent first step phase having been calculated from the slide motion information;

a first correction control section that performs a correction that delays a transfer step of of the servo transfer device disposed on a downstream side of the servo press as compared with the normal transfer operation when the first determination section has determined that the slide upward movement step is in the delayed state;

a transfer position detection section that directly or indirectly detects an actual transfer position of the workpiece of the servo transfer devices;

a second determination section that determines whether or not an upstream-side transfer step is in the delayed state based on a current second step phase in slide downward movement during the normal press operation and an apparent second step phase corresponding to the detected current actual transfer position of the workpiece, the apparent second step phase having been calculated from the transfer motion information corresponding to the servo transfer device disposed on the upstream side of the servo press; and a second correction control section that performs a correction that delays a slide downward movement step of the servo press as compared with the normal press operation when the second determination section has determined that the upstream-side transfer step is in the delayed state.

3. The servo press line operation control device as defined in claim 2, wherein the first determination section determines that the slide upward movement step is in the delayed state when the difference between the current first step phase and the apparent first step phase when the slide is moved upward is larger than a first set phase range; and wherein the second determination section determines that the upstream-side transfer step is in the delayed state when the difference between the current second step phase and the apparent second step phase when the slide is moved downward is larger than a second set phase range.

4. The servo press line operation control device as defined in claim 2, further comprising:

a third determination section that determines whether or not a downstream-side transfer step is in the delayed state based on a detected actual transfer position of the workpiece of one of the servo transfer devices disposed on the downstream side of the servo press and a target transfer position corresponding to a current second step phase included in the transfer motion information stored in the second information storage section; and a third correction control section that performs a correction that delays a transfer step of the servo transfer device disposed on the upstream side of the servo press as compared with the normal transfer operation when the third determination section has determined that the downstream-side transfer step is in the delayed state.

5. The servo press line operation control device as defined in claim 3, further comprising:

a third determination section that determines whether or not a downstream-side transfer step is in the delayed state based on a detected actual transfer position of the workpiece of one of the servo transfer devices disposed on the downstream side of the servo press and a target transfer position corresponding to a current second step phase included in the transfer motion information stored in the second information storage section; and a third correction control section that performs a correction that delays a transfer step of the servo transfer device disposed on the upstream side of the servo press as compared with the normal transfer operation when the third determination section has determined that the downstream-side transfer step is in the delayed state.

* * * * *